US012694296B1

(12) United States Patent
Zheng et al.

(10) Patent No.: US 12,694,296 B1
(45) Date of Patent: Jul. 28, 2026

(54) SCRATCHPAD TENSOR ALLOCATION

(71) Applicant: Amazon Technologies, Inc., Seattle, WA (US)

(72) Inventors: Hongbin Zheng, San Jose, CA (US); Parivallal Kannan, San Jose, CA (US); Yunxuan Yu, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 723 days.

(21) Appl. No.: 18/067,386

(22) Filed: Dec. 16, 2022

(51) Int. Cl.
| | |
|---|---|
| *G06F 3/06* | (2006.01) |
| *G06F 8/41* | (2018.01) |
| *G06F 8/71* | (2018.01) |
| *G06F 9/32* | (2018.01) |
| *G06F 9/50* | (2006.01) |
| *G06F 9/54* | (2006.01) |
| *G06N 3/08* | (2023.01) |
| *G06N 3/084* | (2023.01) |
| *G06N 7/01* | (2023.01) |

(Continued)

(52) U.S. Cl.
CPC ............. *G06N 3/084* (2013.01); *G06F 9/325* (2013.01); *G06F 9/544* (2013.01); *G06N 7/01* (2023.01); *G06F 3/0604* (2013.01); *G06F 3/0631* (2013.01); *G06F 8/41* (2013.01); *G06F 8/42* (2013.01); *G06F 8/65* (2013.01); *G06F 8/71* (2013.01); *G06F 9/5016* (2013.01); *G06F 9/5022* (2013.01); *G06F 9/5033* (2013.01); *G06F 9/54* (2013.01); *G06F 11/3608* (2013.01); *G06N 3/04* (2013.01); *G06N 3/08* (2013.01)

(58) Field of Classification Search
CPC ............ G06N 3/084; G06N 7/01; G06N 3/08; G06N 3/04; G06F 9/325; G06F 9/544; G06F 9/5016; G06F 9/5033; G06F 9/54; G06F 9/5022; G06F 3/0631; G06F 3/0604; G06F 8/41; G06F 8/65; G06F 8/71; G06F 8/42
See application file for complete search history.

(56) References Cited

U.S. PATENT DOCUMENTS

| | | | | |
|---|---|---|---|---|
| 12,423,007 | B1 * | 9/2025 | Ravishankar | ............ G06N 5/02 |
| 2019/0370072 | A1 * | 12/2019 | Walter | .................. G06F 9/5016 |

(Continued)

OTHER PUBLICATIONS

Bouchez, F., et al., "Register Allocation: What Does the NP-Completeness Proof of Chaitan et al. Really Prove? Or Revisiting Register Allocation: Why and How," G. Almási, C. Caşcaval, and P. Wu (Eds.), Languages and Compilers for Parallel Computing (LCPC 2006), Lecture Notes in Computer Science, 2007, vol. 4382, pp. 283-298.

(Continued)

*Primary Examiner* — Anibal Riveracruz
(74) *Attorney, Agent, or Firm* — Weaver Austin Villeneuve & Sampson LLP

(57) ABSTRACT

A technique to perform memory allocation can include obtaining an interference graph of tensors of a neural network model to store in a buffer memory, and determining a set of directed edges and a set of undecided edges in the interference graph. A directed interference graph can be formed from the set of directed edges, and constraints based on the directed interference graph and the set of undecided edges are provided to a constraints solver to assign addresses in the buffer memory for storing the tensors of the neural network model.

20 Claims, 15 Drawing Sheets

1100

Obtain an interference graph of tensors of a neural network model to store in a buffer memory
1102

Determine a set of directed edges and a set of undecided edges in the interference graph
1104

Form a directed interference graph from the set of directed edges
1106

Provide constraints based on the directed interference graph and the set of undecided edges to a constraints solver to assign addresses in the buffer memory for storing the tensors of the neural network model
1108

(51) Int. Cl.

| | |
|---|---|
| *G06F 8/65* | (2018.01) |
| *G06F 11/3604* | (2025.01) |
| *G06N 3/04* | (2023.01) |

(56) References Cited

U.S. PATENT DOCUMENTS

| | | | | | |
|---|---|---|---|---|---|
| 2020/0210832 | A1* | 7/2020 | Driscoll | ................. | G06N 3/063 |
| 2021/0192314 | A1* | 6/2021 | Aarts | .................... | G06F 8/456 |
| 2022/0414455 | A1* | 12/2022 | Collins | ................... | G06N 3/08 |
| 2023/0121044 | A1* | 4/2023 | Grover | ..................... | G06F 8/30 |
| | | | | | 706/25 |
| 2023/0123811 | A1* | 4/2023 | Collins | ................... | G06F 8/443 |
| | | | | | 706/17 |
| 2023/0236888 | A1* | 7/2023 | Zhang | .................. | G06F 9/5033 |
| | | | | | 718/104 |
| 2023/0267166 | A1* | 8/2023 | Elefante | ................ | G06N 10/20 |
| | | | | | 708/200 |

| | | | | | |
|---|---|---|---|---|---|
| 2024/0184548 | A1* | 6/2024 | Bastoul | ..................... | G06F 8/41 |

OTHER PUBLICATIONS

Cong, J., et al., "An Efficient and Versatile Scheduling Algorithm Based On SDC Formulation," DAC '06: Proc. of the 43rd annual Design Automation Conference, 2006, pp. 433-438.

Dai, S., et al., "A Scalable Approach to Exact Resource-Constrained Scheduling Based on a Joint SDC and SAT Formulation," FPGA '18: Proc. of the 2018 ACM/SIGDA International Symposium on Field-Programmable Gate Arrays, Feb. 2018, pp. 137-146.

Isoard, A., "Extending Polyhedral Techniques towards Parallel Specifications and Approximations," Doctoral Thesis, Université de Lyon, National [FR] Thesis No. 2016LYSEN011, 2016, 157 pages (with English translation). URL: https://theses.hal.science/tel-01369014.

* cited by examiner

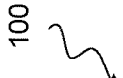
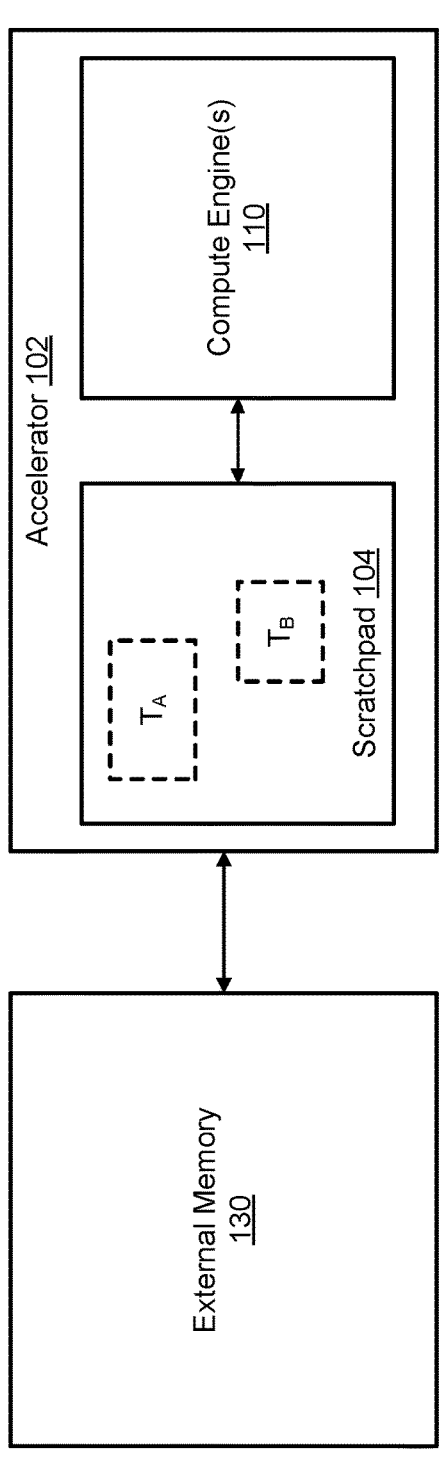
FIG. 1

Program
202

Live Ranges
204

Interference Graph
206

300

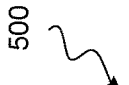
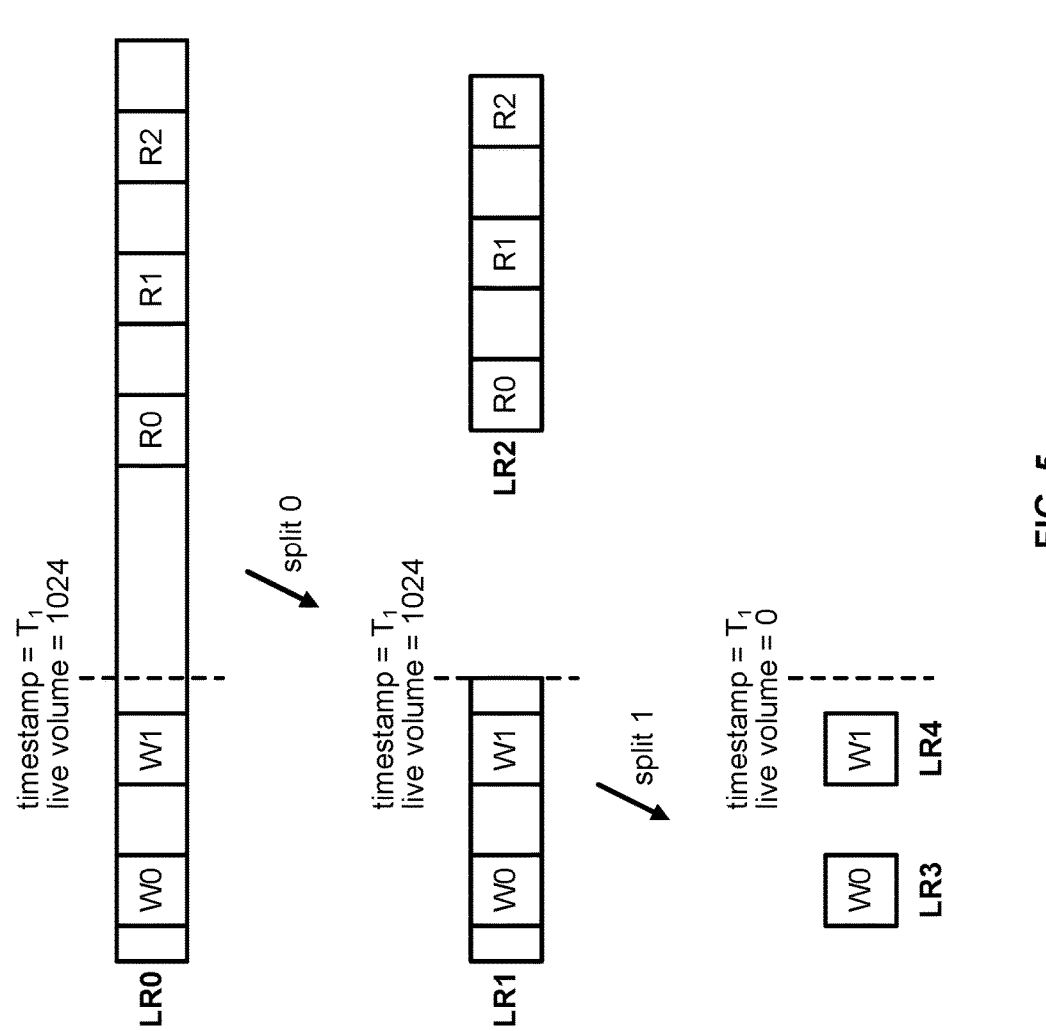
FIG. 5

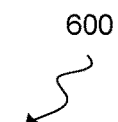
600
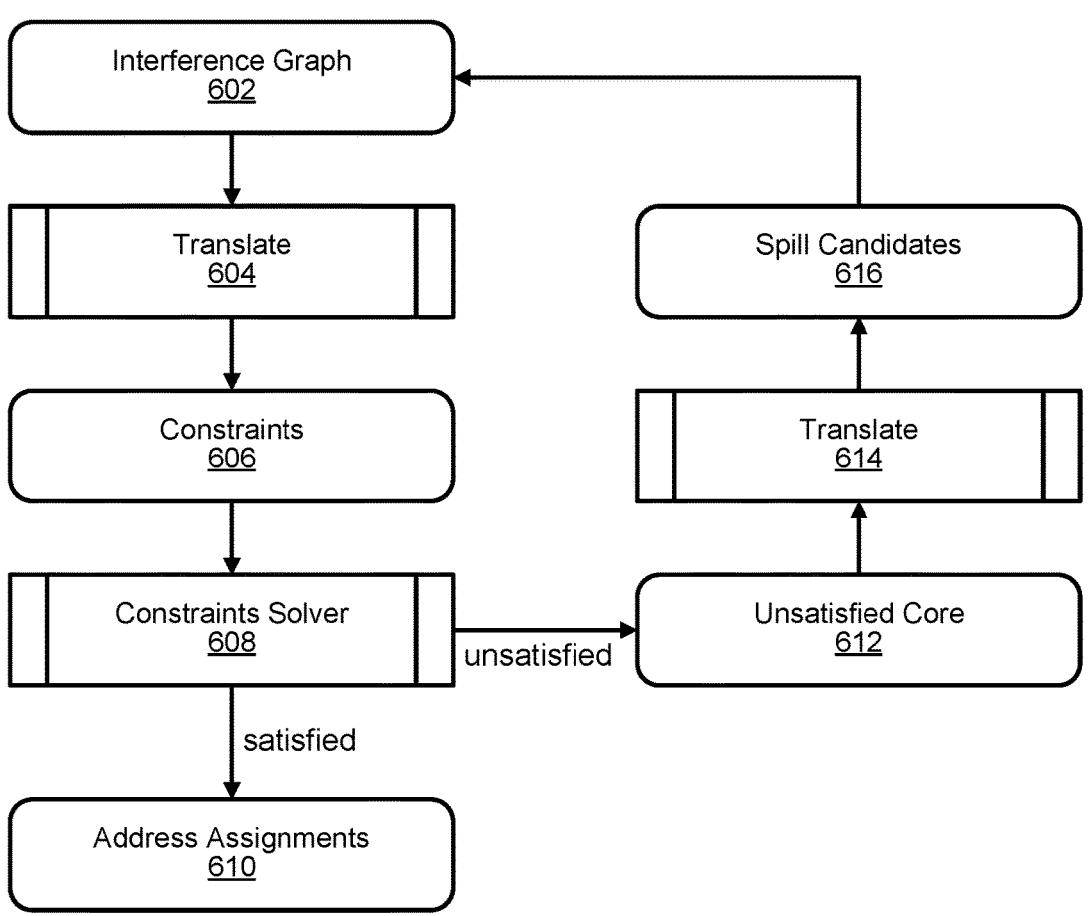
FIG. 6

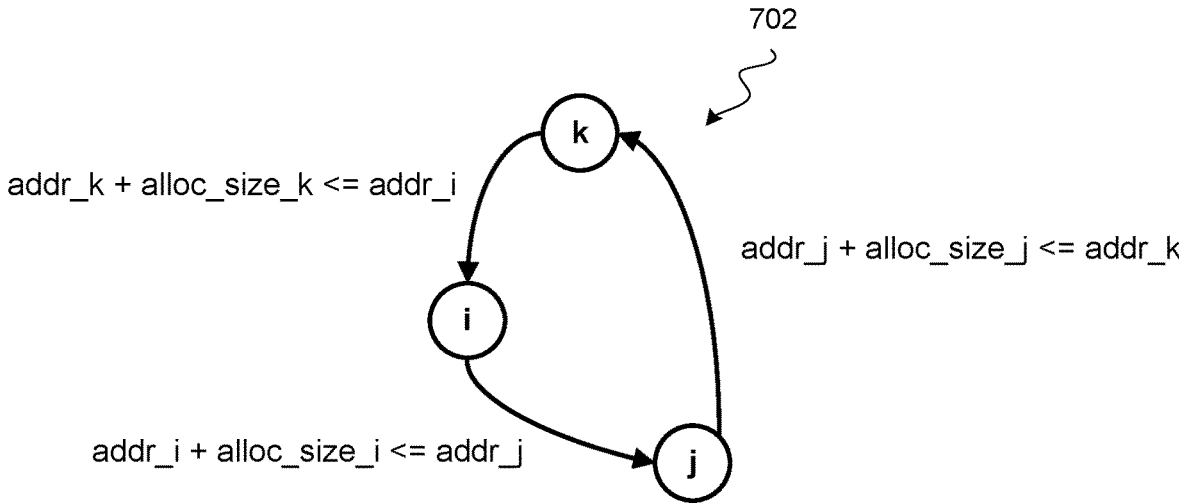
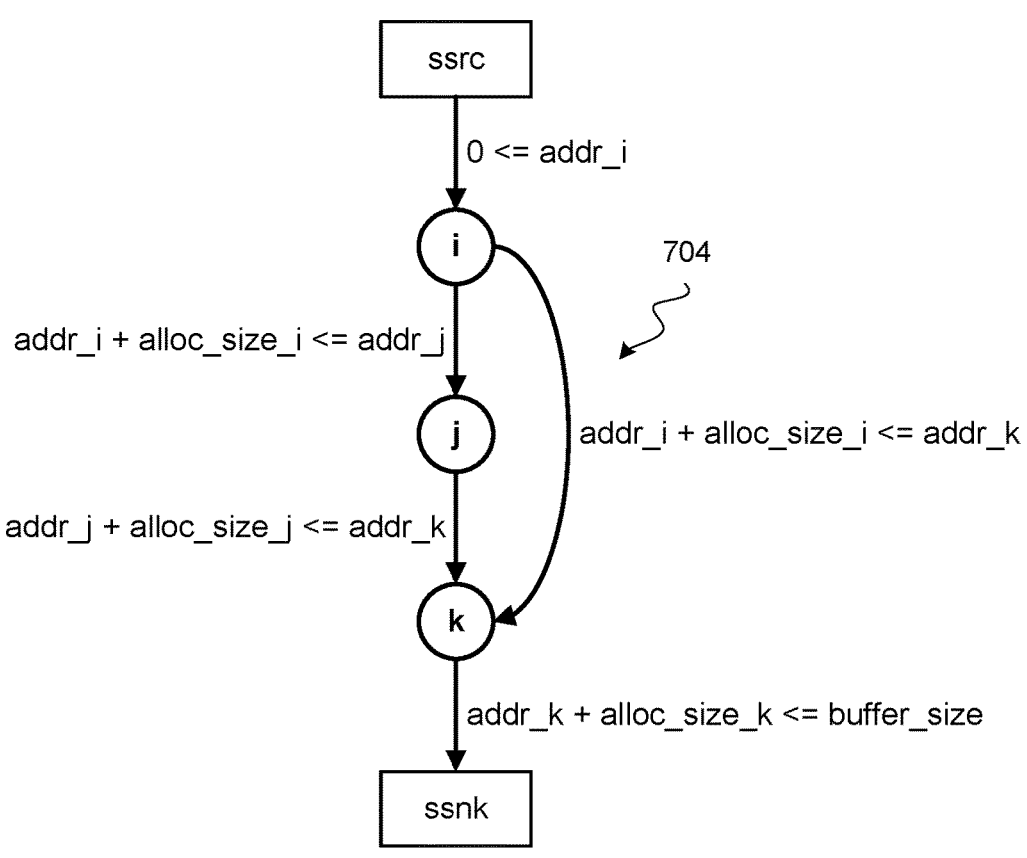
FIG. 7

1000

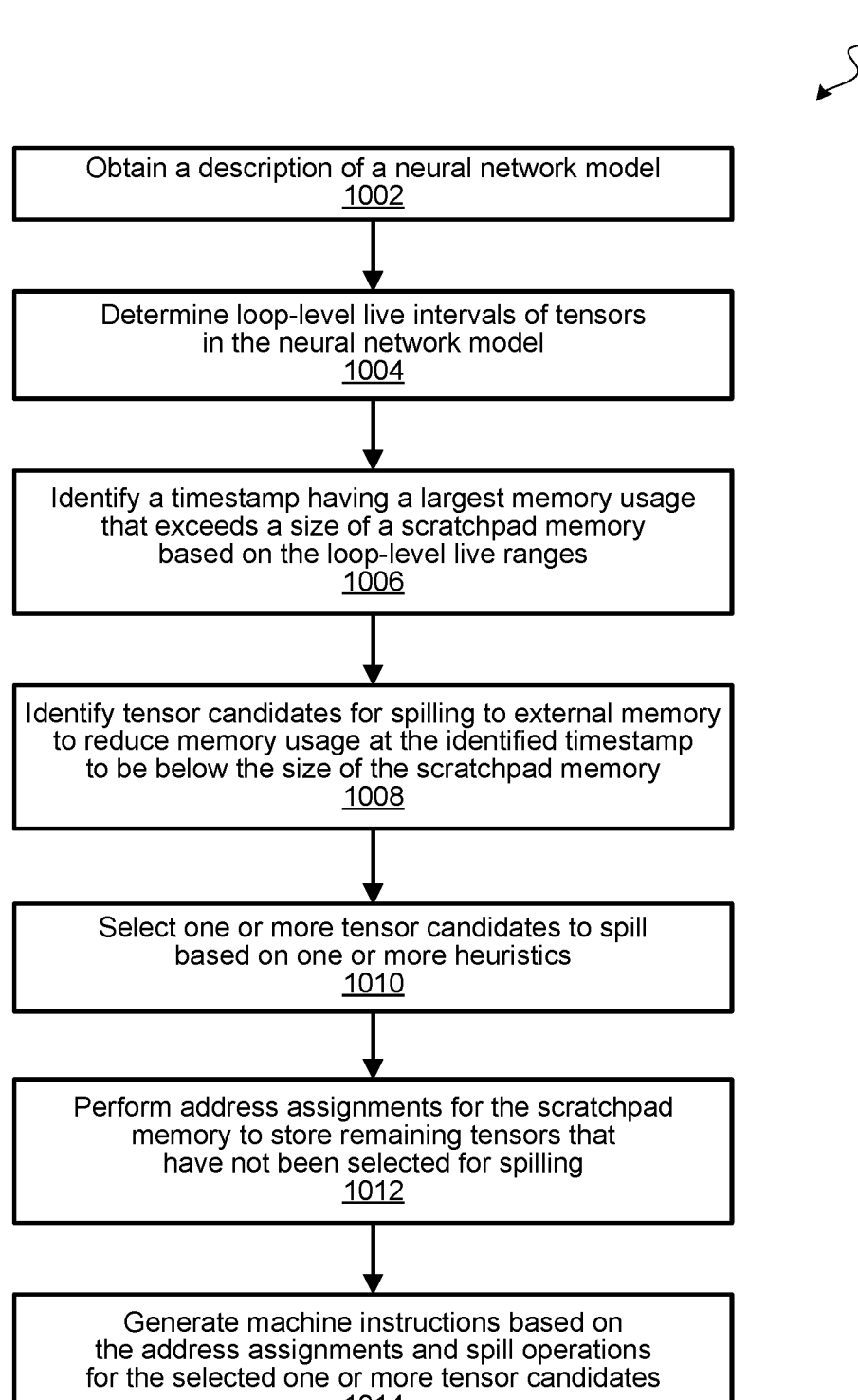

Obtain a description of a neural network model
1002

Determine loop-level live intervals of tensors
in the neural network model
1004

Identify a timestamp having a largest memory usage
that exceeds a size of a scratchpad memory
based on the loop-level live ranges
1006

Identify tensor candidates for spilling to external memory
to reduce memory usage at the identified timestamp
to be below the size of the scratchpad memory
1008

Select one or more tensor candidates to spill
based on one or more heuristics
1010

Perform address assignments for the scratchpad
memory to store remaining tensors that
have not been selected for spilling
1012

Generate machine instructions based on
the address assignments and spill operations
for the selected one or more tensor candidates
1014

FIG. 10

1100

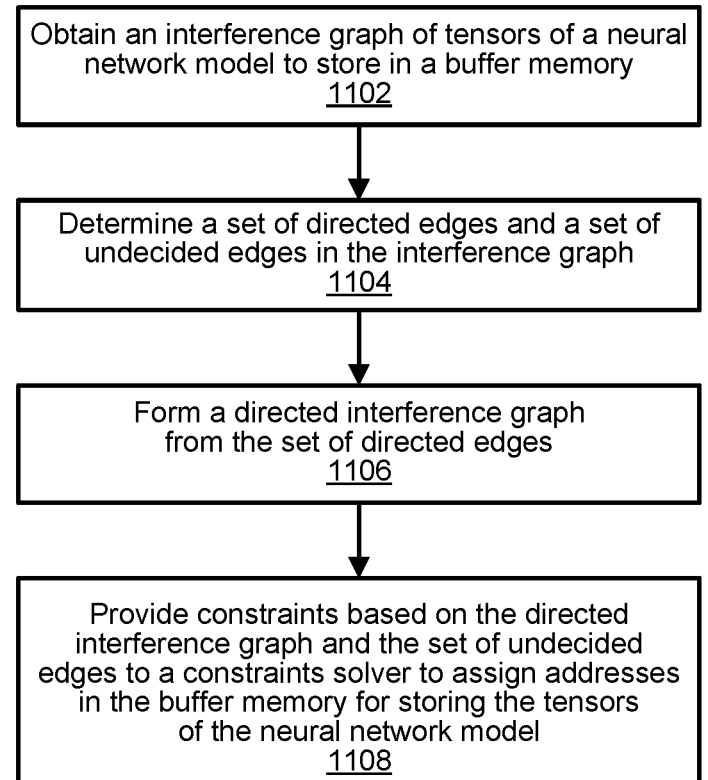

Obtain an interference graph of tensors of a neural
network model to store in a buffer memory
1102

Determine a set of directed edges and a set of
undecided edges in the interference graph
1104

Form a directed interference graph
from the set of directed edges
1106

Provide constraints based on the directed
interference graph and the set of undecided
edges to a constraints solver to assign addresses
in the buffer memory for storing the tensors
of the neural network model
1108

FIG. 11

SCRATCHPAD TENSOR ALLOCATION

BACKGROUND

Neural networks utilize computational models to perform complex tasks such as image recognition, natural language processing, among others. A neural network can involve various computations performed on tensors such as matrix multiplication operations, activation operations, pooling operations, etc. Neural networks can be executed on specialized hardware such as neural network accelerators that have circuitry tailored to perform common neural network computations.

BRIEF DESCRIPTION OF THE DRAWINGS

Various embodiments in accordance with the present disclosure will be described with reference to the drawings, in which:

FIG. 1 illustrates a simplified block diagram of an example of a computing system;

FIG. 5 illustrates a conceptual diagram of an example of splitting a live range;

FIG. 6 illustrates a flow diagram of an example workflow of an address assignment process;

FIG. 7 illustrates examples of directed interference graphs;

FIG. 10 illustrates a flow diagram of an example of a compilation process;

FIG. 11 illustrates a flow diagram of an example of an address assignment process;

DETAILED DESCRIPTION

Figure 2:
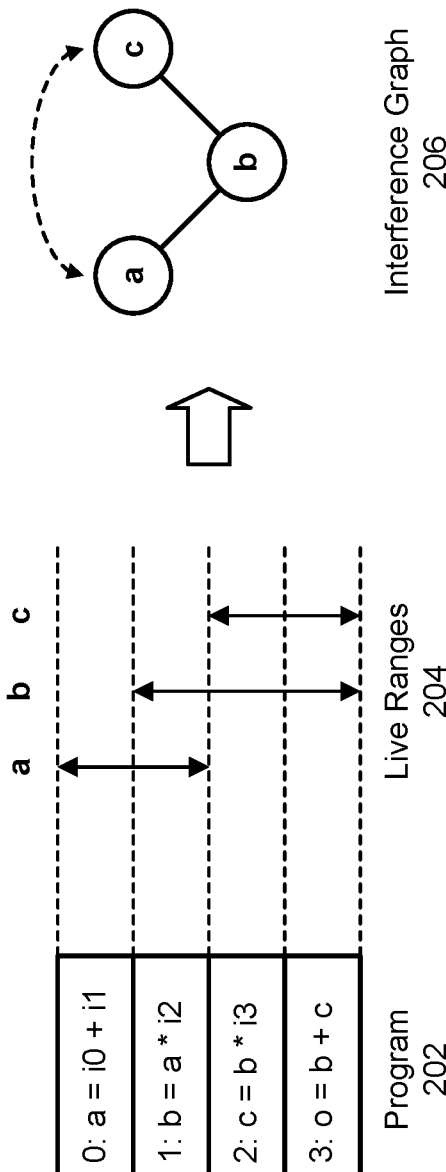
FIG. 2 illustrates a conceptual diagram of an example of generating an interference graph.

Memory allocation is a technique to map data used in a computer program to the available on-chip memory. Storing data used by a computer program in on-chip memory can result in faster execution because the latency and overhead associated with accessing off-chip memory can be avoided. However, the size of the on-chip memory is limited. Thus, it may not be possible to retain all data used by the computer program in the on-chip memory for the lifetime of the corresponding data. As such, despite the performance penalties, some of the data may nevertheless be spilled to external memory.

Neural network accelerators used for machine learning applications can have a large on-chip buffer memory (e.g., may also be referred to as a scratchpad memory) to avoid fetching data from slower external memory. Unlike associative caches used in general-purpose processors whose content is managed by hardware, the on-chip memory used by such accelerators is typically managed by software. A compiler can be used to assign the data of a neural network to physical addresses in the buffer memory, and to determine which data to spill to minimize the performance penalties introduced by the spill operations. Identifying the optimal data to spill that minimizes the performance penalties can be a time-consuming process, especially given that the data used in machine learning applications are typically multi-dimensional tensors that can vary in size and dimension.

The techniques disclosed herein can be utilized by a compiler to perform memory allocation by performing a memory pressure analysis to identify spills that can reduce the estimated memory usage to the scratchpad memory size, and then subsequently using a constraints solver to find a suitable address assignment solution to assign physical addresses in the scratchpad memory to the tensors of the neural network. To reduce the compilation processing time, live ranges of tensors considered in the memory pressure analysis can be estimated using loop-level live intervals. Although such estimations may not be the most precise, such estimations allow the scratchpad overflows to be identified quickly. Furthermore, during the address assignment phase, the set of constraints provided to the constraints solver can be simplified by approximating an interference graph with a directed interference graph. This reduces the complexity of the address assignment task from non-deterministic polynomial-time (NP) to a polynomial-time (P) complete problem, and thus further improves the compilation processing time.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 illustrates an example of a simplified block diagram of a computing system 100 that includes a hardware accelerator 102. Accelerator 102 may include a compute engine 110 and a scratchpad memory 104. Scratchpad memory 104 acts as a buffer memory for compute engine 110. During operation, compute engine 110 may read data from scratchpad memory 104, perform computations on the data, and write back the results of the computations back to scratchpad memory 104. The results can be intermediate results that are further processed at a later point in time to derive the final computational results. Depending on the computer program being executed by compute engine 110 and the size of the data being operated on, not all of the data used by compute engine 110 may simultaneously fit in scratchpad memory 104. As such, some of the data can be copied from scratchpad memory 104 to external memory 130 when the data is temporarily not needed to free up space in scratchpad memory 104. When that data is used again at a later point in time, the data can be copied from external memory 130 back into scratchpad memory 104 for processing by compute engine 110. The process of moving data to external memory 130 is referred to as spilling.

Accessing scratchpad memory 104 (e.g., can be implemented using static random-access memory) is typically faster than accessing external memory 130 (e.g., can be implemented using dynamic random-access memory). As such, spilling data to external memory 130 comes with performance penalties due to the additional access latency and overhead associated with writing to and reading from external memory 130. Although techniques such as data staging and direct memory access (DMA) can be used to hide some of the memory access latencies, spilling data to external memory will generally slow down execution of the computer program. As such, it is desirable to identify spill candidates that can minimize the performance penalties.

In some implementations, accelerator 102 can be a neural network accelerator that performs neural network computations. For example, compute engine 110 can include a processing engine (PE) array (e.g., a systolic array), and scratchpad memory 104 can be a state buffer. The state buffer acts as a cache for the PE array. The PE array includes processing engines arranged in rows and columns such as m×n number of processing engines. Each processing engine may include a multiplier circuit and an adder circuit to perform a multiply-and-add operation.

During operation, tensors such as feature map and/or weight matrices are shifted horizontally along the row direction into the PE array from the state buffer. The multiplication results are accumulated vertically and written into a partial sum (PSUM) buffer (not shown) along the column direction. The accumulated results can be written back to the state buffer from the PSUM buffer, and be used as inputs for subsequent computations. The state buffer may include the same number of row partitions as the number of rows in the PE array. Each row of the state buffer can feed into one row of the PE array. A tensor that is subject to a matrix multiplication computation to be performed in the PE array will have data elements spanning across multiple row partitions of the state buffer, and across multiple memory locations within each row partition of the multiple row partitions. In addition to a PE array, a neural network accelerator may include other compute engines that can access and perform computations on data from the state buffer. For example, a neural network accelerator may include an activation engine, a pooling engine, and/or a vector compute engine that read and write data to the state buffer.

Performing memory allocation to assign physical addresses in scratchpad memory 104 (e.g., state buffer) for a neural network accelerator has the added complexity that the tensors being stored in scratchpad memory 104 are multidimensional arrays that can vary in size and dimension. For example, a tensor TA and a tensor TB of different sizes can be stored in scratchpad memory 104 at the same time. The scratchpad memory 104 can also be organized in multidimensions (e.g., partitions, and locations within each partition). Because of the multidimensionality and non-uniform sizes of the tensors, addresses are typically not assigned in a linear manner. To ensure that the tensors being simultaneously stored in scratchpad memory 104 do not overlap, the address assignment may have to consider constraints in multiple dimensions. This can also impact spilling operations because identifying the optimal tensor(s) to spill will also have to consider the multidimensionality and non-uniform sizes of the tensors.

In order to minimize spills without altering the program behavior and semantics, the variables and arrays utilized during program execution can be modeled using live ranges. The same scratchpad memory locations can be shared between two variables/arrays when the corresponding live ranges do not intersect with each other. The memory allocation process can use an interference graph to capture the intersect relationships between the live ranges to determine which variables/arrays can share the same memory locations, and which variables/arrays are assigned different memory locations. For instances in which the scratchpad memory 104 is not big enough to store all the variables/ arrays that have overlapping live ranges, some of the variables/arrays can be spilled to external memory. Although the description herein may refer to performing memory allocation for tensors used in a neural network, it should be understood that the techniques described herein can be applied to performing memory allocation for variables and arrays, and can be extended to other applications that utilize multidimensional data.

FIG. 2 illustrates an example of an interference graph 206 generated from a simplified program code 202. Program code 202 includes four statements. Statement 0 writes the result of a computation on two inputs to variable a; statement 1 writes to variable b the result of performing a computation on variable a; statement 2 writes to variable c the result of performing a computation on variable b; and statement 3 outputs the result of performing a computation on variables b and c.

The live ranges 204 of each variable is determined as follows. Variable a is written by statement 0 and is last read by statement 1. Thus, the live range of variable a spans from statement 0 to statement 1. Variable b is written by statement 1 and is last read by statement 3. Thus, the live range of variable b spans from statement 1 to statement 3. Variable e is written by statement 2 and is last read by statement 3. Thus, the live range of variable c spans from statement 2 to statement 3. As the live ranges show, the live ranges of variable a overlaps with variable b, and the live ranges of variable b overlaps with variable c. However, variable a does not overlap with variable b.

The nodes of interference graph 206 represents the variables of program code 202. Interference graph 206 includes an edge between variable a and variable b because the live ranges of variables a and b overlap. Interference graph 206 also includes an edge between variable b and variable c because the live ranges of variables b and c overlap. Interference graph 206, however, does not include an edge between variable a and variable c, because the live ranges of variables a and c do not overlap. Hence, interference graph 206 indicates that variables a and c can share the same memory location, because there is no edge between these two variables given that the live ranges of the two variables do not overlap with each other.

As mentioned above, memory allocation for storing tensors in a buffer memory of an accelerator (e.g., scratchpad memory 104 of accelerator 102) can be more complex than allocation that is typically performed with general purpose processors. Unlike conventional register allocation whose allocation units have uniform size, allocation units in scratchpad memory allocation have non-uniform sizes, which can introduce fragmentation in the scratchpad, and potentially lead to poor utilization of scratchpad memory and bigger spill penalties. This makes the scratchpad memory allocation a NP-complete problem even before considering critical edges and spill optimization. In some implementations, the scratchpad memory 104 can be organized in n-dimensions, and thus the allocation is also performed in n-dimensional address space. The architecture of some accelerators may also impose extra constraints to the addresses of tensors used by certain instructions. For example, the operands of certain operations may need to be assigned to the same starting memory partition. As another example, the address difference between two operands of certain operations may need to be within a threshold number of bytes. In order to perform address assignment taking into consideration these various complexities, the address assignment problem can be formulated as a set of satisfiability modulo theories (SMT) constraints, and the set of constraints can be solved with a constraints solver such as a SMT solver.

Figure 3:
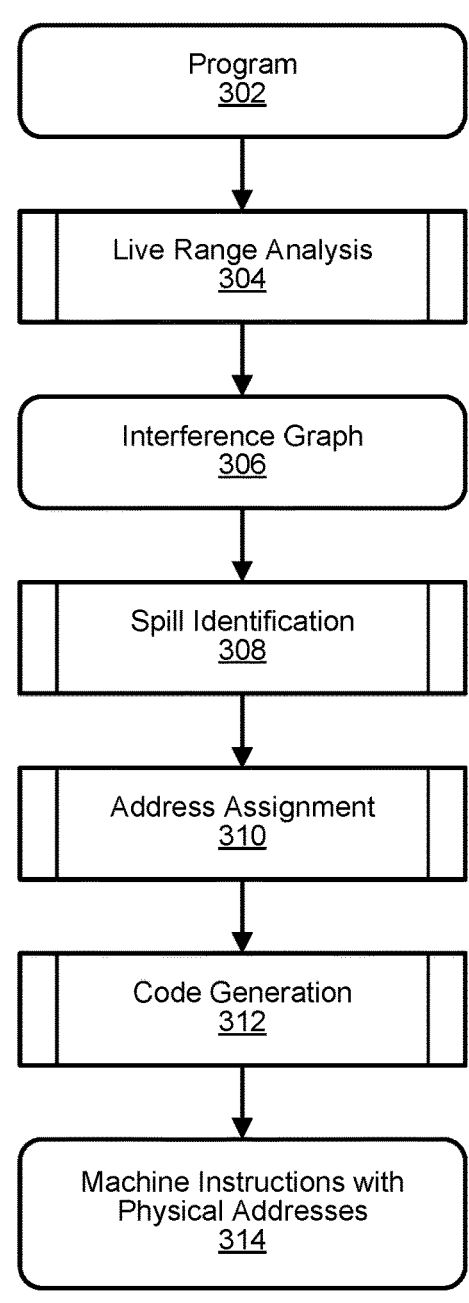
FIG. 3 illustrates a flow diagram of an example workflow of a compilation process.

FIG. 3 illustrates a flow diagram of an example of the workflow of a memory allocation process 300. Memory allocation process 300 may begin with a program 302 representing a neural network to be executed by an accelerator. In some implementations, program 302 can be an intermediate representation derived from a description of a neural network model written in a programming language. The programming language can be a general-purpose programming language such as Python, Java, C++, etc., or a programming language tailored for neural networks such as TensorFlow, PyTorch, etc.

At operation 304, a live range analysis can be performed on the tensors used by the neural network. Tensors used in a neural network can be represented as loopnests in program 302. The live range of a tensor can be approximated using loop-level live interval, which models the live range using timestamps represented as the affine schedule of the tensor. Although using timestamps represented as affine schedules can result in an over estimation of the live range of the tensor, it is computationally inexpensive to determine live range conflicts when using such timestamp representations. Additional details of the loop-level live interval will be explained below. An interference graph 306 can then be generated based on the live range conflicts determined by the live range analysis.

At operation 308, a spill identification process can be carried out by performing a linear scan of the memory usage over program 302 based on the live range analysis. The memory usage at the various timestamps can also be referred to as memory pressure. Timestamps having a memory usage exceeding the size of the scratchpad memory can be determined, and tensors that are live at those timestamps can be identified as spill candidates. For example, spill candidates for the timestamp having the largest memory pressure can be considered first, and an exploration of the spill candidates can be carried out using deterministic heuristics to select one or more suitable tensor candidates to spill to reduce the memory usage at the determined timestamp to be below the size of the scratchpad memory.

At operation 310, after determining the spill candidates that can reduce the memory usage estimation to be within the size of the scratchpad memory, address assignment can be performed on the remaining tensors. The address assignment can be performed by providing a set of constraints to a solver such as a SMT solver. To reduce the compilation time and to reduce the address assignment from NP-complete to P-complete, the set of constraints can be simplified by approximating certain edges of an interference graph of the remaining tensors with a directed interference graph. Additional details of optimizing the address assignment process will be further explained below. It should be noted that in some implementations, the address assignment performed at operation 310 may introduce additional spills due to fragmentation of the scratchpad memory.

At operation 312, when the address assignments have been performed and the spill operations have been identified, a code generation process can be performed for program 302 to generate machine instructions 314 that can be executed on the accelerator. The resulting machine instructions 314 can include load and store operations using physical addresses of the scratchpad memory, as well as the spill and corresponding fill operations for moving tensors between the scratchpad memory and external memory.

Loop-Level Live Interval

One approach to model the liveness of a tensor is to use the live interval of the tensor. A tensor can be considered live after the first write to any element of that tensor, until the last read to any element of that tensor. The first instruction that writes the tensor can be referred to as the define instruction (or def-inst) of tensor, and the last instruction that reads the tensor can be referred to as the kill instruction (or kill-inst). The timestamp that the def-inst is scheduled can be referred to as the def-slot of the live interval, and the timestamp that the kill-inst is scheduled can be referred to as the kill-slot of the live interval. The live interval of the tensor can be considered as starting at the def-slot and ending at the kill-slot.

By using live intervals, it can be determined if two tensors are live at the same time (e.g., during live range analysis in operation 304), and thus should not share the same address between these two tensors. Two tensors are considered live at the same time if their live intervals overlap. Two live intervals L0 and L1 overlap if:

def-slot (L0)<=def-slot (L1)<=kill-slot (L0); or
def-slot (L1)<=def-slot (L0)<=kill-slot (L1).

It should be noted that it is not necessary for the live-time conflict test to be precise. Having a live-time conflict return true when there is no actual conflict does not result in erroneous execution. However, execution errors can occur if a live-time conflict returns false when there is an actual conflict resulting in the same address being assigned to two different tensors that are live at the same time.

The processing time to perform the live-time conflict test can be up to $O(n^2)$, where n is the number of live intervals. For a neural network model that operates on a large number of tensors, the live-time conflict test can be computationally intensive. In order to speed up the live-time conflict test, over-approximations can be applied to the live interval representations to generate imprecise but correct results.

As indicated above, the live-time conflict test involves comparing the def-slots and kill-slots. For a straight-line control flow, the position of an instruction in the instruction stream can be used as the timestamp of that instruction. However, tensor operations are typically represented as loopnests in the program code. Defining timestamps under the loopnests structure without unrolling the loops can reduce the compilation processing time.

In the polyhedral compilation model, iteration domains are used to capture the dynamic instances of instructions. An affine function can be used to map dynamic instances of each instruction to a timestamp. The affine schedule will be denoted as 0 below.

For example, in the following program code:

```
for (10 = 0; 10 < 128; ++i0) {
    T2 = inst0 // def T2
    for (j0 = 0; j0 < 512; ++j0) {
            T0 = inst1 // def T0
            T1 = inst2(T0) // def T1, use T0
    }
    inst3
}
inst4(T2) // use T2
for (i1 = 0; i1 < 128; ++i1) {
    for (j1 = 0; j1 < 128; ++j1) {
            for (k1 = 0; k1 < 128; ++k1) {
                inst5(T1) // use T1
                inst6
            }
    }
}
```

7 the affine schedules (or the timestamps) for the various instructions (inst1 to inst6) can be represented as:

$\theta^{inst0}=(0, 10, 0)$ $\theta^{inst1}=(0, i0, 1, j0, 0)$ $\theta^{inst2}=(0, 10, 1, j0, 1)$ $\theta^{inst3}=(0, 10, 2)$ $\theta^{inst4}=(1)$ $finst5=(2, i1, 0, j1, 0, k1, 0)$ $\theta^{inst6}=(2, i1, 0, j1, 0, k1, 1)$ The affine schedule $\theta$ is defined in the lexicographic order of the loopnests, and thus: $\theta^{inst0}<\theta^{inst1}<\theta^{inst2}<\theta^{inst3}<\theta^{inst4}<\theta^{inst5}<\theta^{inst6}$ In the affine schedules above, the first value represents the top-level statement number that the instruction belongs to. The second value is the first level loop index under the top-level statement. The third value is the statement number within the first level loop that the instruction belongs to. The fourth value is the second level loop index under the first-level statement. The fifth value is the statement number within the second level loop that the instruction belongs to, and so on.

Hence, taking instruction inst0 as an example, the first value of the affine schedule $\theta^{inst0}$ is 0, because inst0 is part of the first top-level statement (when starting the statement count from 0). The second value of the affine schedule $\theta^{inst0}$ is the loop index i0, because inst0 is part of the for-loop with index i0. The third value of the affine schedule $\theta^{inst0}$ is the 0, because inst0 is part of the first statement inside the for-loop with index i0.

Taking instruction inst2 as another example, the first value of the affine schedule $\theta^{inst2}$ is 0, because inst2 is part of the first top-level statement. The second value of the affine schedule $\theta^{inst2}$ is the loop index i0, because inst02 is part of the for-loop with index i0. The third value of the affine schedule $\theta^{inst2}$ is the 1, because inst2 is part of the second statement inside the for-loop with index i0 (the second statement inside the for-loop with index i0 is the for-loop with index j0). The fourth value of the affine schedule $\theta^{inst2}$ is the j0, because inst2 is part of the for-loop with index j0. The fifth value of the affine schedule $\theta^{inst2}$ is the 1, because inst2 is part of the second statement inside the for-loop with index j0.

Taking instruction inst4 as further example, the first value of the affine schedule $\theta^{inst4}$ is 1, because inst1 is part of the second top-level statement.

Using the affine schedule as timestamp, the loop-level live intervals (LI) for the tensors T0, T1, and T2 can be represented using the def-slots and kill-slots as:

$$LI(T0) = [\theta^{inst1}, \theta^{inst2}] = [(0, i0, 1, j0, 0), (0, i0, 1, j0, 1)]$$

$$LI(T1) = [\theta^{inst2}, \theta^{inst5}] = (0, i0, 1, j0, 1), (2, i1, 0, j1, 0, k1, 0)]$$

$$LI(T2) = [\theta^{inst0}, \theta^{inst4}] = [(0, i0, 0), (1)]$$

Based a comparison on the lexical order of the affine schedules, LI(T0) conflicts with LI(T2), and LI(T1) conflicts LI(T2).

Referring to the affine schedules above, the odd indexed elements reflect the static order of the instruction in the loop forest, and the even indexed elements reflect the order of the dynamic instances in the iteration domain of the loopnest that contains the instruction. The odd indexed elements can be referred to as the β-vector, and the even indexed elements can be referred to as the a-vector. Thus, using inst5 as an example, the β-vector for inst5 is (2, 0, 0, 0, 0) and the a-vector for inst5 is (i1, j1, k1). Comparing affine expressions involving loop indices (e.g., i0 versus i1) can be time consuming. Thus, to avoid having to compare affine expressions when determining live-time conflicts, the affine expressions in the a-vector can be replaced with a constant. For example, for a def-slot, the affine expressions in the a-vector can be replaced with their minimum value; for a kill-slot, the affine expressions in the a-vector can be replaced with their maximum value.

Applying such approximations, the loop-level live intervals from above can be approximated as:

$$LI(T0) = [(0, i0, 1, j0, 0), (0, i0, 1, j0, 1)] \approx$$
$$[(0, 0, 1, 0, 0), (0, 127, 1, 511, 1)]$$
$$LI(T1) = [(0, i0, 1, j0, 1), (2, i1, 0, j1, 0, k1, 0)] \approx$$
$$[(0, 0, 1, 0, 1), (2, 127, 0, 127, 0, 127, 0)]$$
$$LI(T2) = [(0, i0, 0), (1)] \approx [(0, 0, 0), (1)]$$

Such over-approximated live intervals will give over-approximated results during the live-time conflict tests. For example, using the over-approximated live intervals, LI(T0) conflicts with LI(T2), LI(T0) conflicts with LI(T1) (which is not precise but not incorrect), and LI(T1) conflicts with LI(T2). Such results can still be used, but may not be necessarily precise (because the results contain an unnecessary life-time conflict). In some implementations, instead of using the minimum and maximum loop index values (e.g., 0 and 127), other numeric symbols that preserve the live interval comparisons can be use. For example, instead using the minimum and maximum loop index values, the a-vector can be replaced with the values (0, 1, 2). If the live interval spans multiple loops, then the def-slot of the iteration domain can be replaced with the low value 0, and the kill-slot of the iteration domain can be replaced with the high value 2. If the live interval exists within a loop, then iteration domain for both the def-slot and the kill-slot can be replaced with the middle value of 1, and the kill-slot of the iteration domain can be replaced with 2. Such approximations of the loop-level live intervals can improve the processing time of the live-time conflict checks Spill Identification A condition for spill to happen is when the total live data volume at a given point in time exceeds the size of the scratchpad memory. The spill identification process (e.g., operation 308) can be modeled as a decision tree, and the decision tree can be explored and pruned to find spills that minimize the performance penalties. The algorithm can take all live ranges of the interference graph as the input, and calculate the memory pressure (e.g., the memory usage or live data volume) at each timestamp by a linear scan. Upon calculating the memory pressure at each timestamp, the timestamp with the maximum memory pressure can be identified. Once exploration of the decision tree has started, instead of using the maximum memory pressure at each step, the timestamp from the parent state of the decision tree can be used if the memory pressure at timestamp from the parent state still exceeds the scratchpad size. Reusing the timestamp from the parent state can speed up the algorithm because it is not necessary to scan the memory pressure profile to find the timestamp with the maximum memory pressure frequently. Additional spills can be proposed until the memory pressure is below the scratchpad memory size. Once the memory pressure is below the scratchpad memory size, the leaf of the decision tree has been reached and no additional spill is needed at the current stage. The spill penalties can be calculated and back propagated to the parent states of the decision tree.

Figure 4:
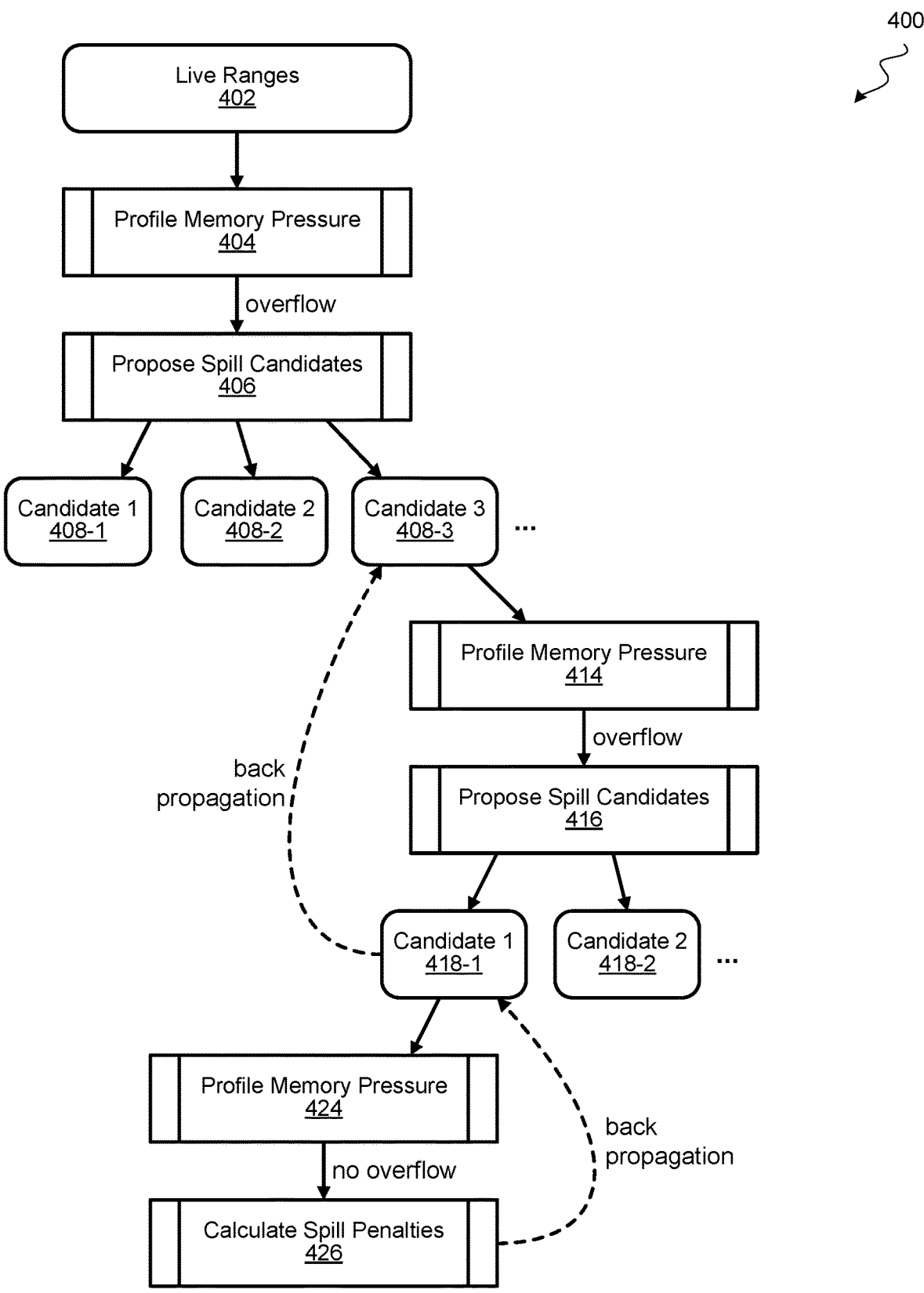
FIG. 4 illustrates a conceptual diagram of an example of a spill identification process.

FIG. 4 illustrates an example of the spill identification process 400. The spill identification process 400 can start with the live ranges 402 of the tensors utilized in the neural network. At operation 404, the memory pressure of the execution flow is profiled by analyzing the overlapping live ranges. For a given timestamp at which the memory usage exceeds the scratchpad memory size (e.g., the timestamp having the largest memory pressure over the scratchpad memory size), the tensors that are live at that timestamp can be proposed as spill candidates at operation 406. For example, the spill candidates proposed at operation 406 may include candidate 408-1, candidate 408-2, candidate 408-3, etc., which may correspond to live tensors for the given timestamp at which the memory usage overflows the scratchpad memory.

In each state of the decision tree, choosing different actions may impact the final spill penalties differently. Hence, each spill action proposal can be considered, and the one that leads to smallest spill penalties is chosen. A given spill action proposal can be evaluated by first following that proposal to a child state of the decision tree to try to reach a leaf state of the decision tree. Once the leaf state is reached at which the memory usage no longer overflows the scratchpad memory, the spill penalties of the leaf state can be back propagated to the starting spill action proposal as the cost of the proposal. The path to the leaf state can be selected based on deterministic heuristics. Examples of the deterministic heuristics that can be used include the size of the tensor, the live range of the tensor, a ratio of the size to the live range of the tensor, etc.

By way of example, candidate 408-3 can be selected as the spill candidate to explore based on the deterministic heuristics. At operation 414, the memory pressure is profiled by analyzing the overlapping live ranges when candidate 408-3 is spilled. If the scratchpad memory is still overflowing, operation 416 proposes another set of spill candidates. For example, the spill candidates proposed at operation 416 may include candidate 418-1, candidate 418-2, etc. At this child state, candidate 418-1 can be selected as the spill candidate to explore based on the deterministic heuristics. At operation 424, the memory pressure is profiled by analyzing the overlapping live ranges when candidate 418-1 is spilled.

If the scratchpad memory no longer overflows (e.g., memory usage is below the scratchpad memory size), the leaf state has been reached, and operation 426 can calculate the spill penalties for spilling candidate 418-1. The spill penalties may include a calculation of the total data transfer volume and the latency associated with moving candidate 418-1 to external memory, and taking into consideration if any of the additional latency can be hidden by program execution (e.g., by performing background loading). The spill penalties associated with candidate 418-1 is back propagated, and the spill penalties for candidate 408-3 is calculated and added to the spill penalties associated with candidate 418-1. Other spill candidates can be explored and evaluated in a similar manner, and the candidate having the smallest spill penalties can be selected for the actual spill operation.

For a given spill candidate, there can be multiple spill actions available to reduce the live data volume at the given timestamp. This can be true especially when the live ranges are calculated using loop-level live intervals without unrolling the loops. The different spill actions have a hierarchical structure, which allow the decision space to be explored in a greedy manner and still achieve minimal spill traffic.

FIG. 5 illustrates an example of spill actions 500 for a live range LR0 associated with a tensor. It should be noted that live range LR0 may extend beyond the timestamp of the first instruction that accesses the tensor (e.g., WO) and the last instruction that uses the tensor (e.g., R2). Such a live range can be possible due to loop-carried dependencies (tensor having a live range spanning multiple loops). In the example shown, the live data volume at timestamp $T_1$ can be 1024 data elements. When the live range LR0 is split into live ranges LR1 and LR2, live range LR1 may still intersect with timestamp $T_1$, and thus the data volume at timestamp can remain at 1024 data elements. When live range LR1 is further split into live ranges LR3 and LR4, both of these live ranges no longer intersect with timestamp $T_1$, and thus the live volume associated with the tensor is reduced to 0 at timestamp $T_1$.

As shown by the example of FIG. 5, the live range splitting at a target timestamp is hierarchical (e.g., LR0 is split into {LR3, LR4, RL2} by splitting LR0 to {LR1, LR2} first, and then to {LR3, LR4, LR2}. The spill penalty will increase in the splitting sequence, as each split introduces additional accesses to external memory (e.g., additional DMA traffic). The live volume at a given timestamp does not increase in the splitting sequence. As such, the first split action in the sequence that can reduce the live volume at the target timestamp can be proposed as a spill candidate first for a given live range.

In each state of the decision tree, multiple spill actions can be proposed, and choosing different actions may impact the final spill penalties differently. Each spill action proposal can be evaluated, and the one that leads to smallest spill penalties can be chosen. In some implementations, the decision tree to identify spills to minimize spilling penalties can be huge. To improve the processing time, the decision tree can be pruned by sorting the spilling action proposals based on a heuristics (e.g., tensor size, live range, etc.). When an action [i] in a state in decision tree is chose, the actions [0] . . . action [i−1] can be excluded from the descendants of the state. By structuring the decision tree as such, for a given state, if action [i] leads to no valid spill solution (due to exclusion), action [j] where j>i will also lead to no valid solution. Hence, these actions can be pruned from the decision tree. By pruning the decision tree, the number of proposals to evaluate can be reduced.

Address Assignment

After the spill identification stage, physical addresses in the scratchpad memory can be assigned to the tensors correspond to each live range during address assignment (e.g., operation 310). It should be noted that during address assignment, additional spill operations can be generated due to fragmentation of the scratchpad memory (e.g., to store multidimensional tensors). The address assignment can be performed using a constraints solver such as a SMT solver by providing constraints to describe a legal address assignment. To improve the compilation processing time, the constraints can be simplified to translate the problem into single source longest path problem, and to allow the constraints solver to operate on a smaller subgraph.

Constraints for a legal address assignment for a scratchpad memory having a certain size (referred to as the buffer size) can be expressed as follows:
1. Legal address constraints: for each live range LR (i):
   a. 0<addr_i, and
   b. addr_i+alloc_size_i<=buffer_size 2. Interference constraints: for interference edge (LR(i), LR(j)):
   a.    $addr\_i+alloc\_size\_i <= addr\_j$,   or   $addr\_j+alloc\_size\_j <= addr\_i$
3. Other constraints based on accelerator architecture and/or tensor operation.

The set of constraints can be provided to a solver to find an address assignment solution that satisfies all constraints. If the constraints solver is unable to satisfy certain constraints, the unsatisfied constraints can form an unsatisfied core, and spill candidates can be identified from the unsatisfied core.

FIG. 6 illustrates a flow diagram of an example of the workflow of an address assignment process 600 for a scratchpad memory. In some implementations, address assignment process 600 can be used, for example, to implement operation 310. Address assignment process 600 may begin with an interference graph 602 generated based on the live range conflicts. The interference graph 602 may exclude spill operations that were identified in operation 308. Hence, the tensors included in interference graph 602 can theoretically be fitted into the scratchpad memory. However, due to the non-uniformity size of the tensors as well as other architectural requirements, address assignment process 600 may generate additional spill operations in order to derive a set of valid address assignments.

At operation 604, interference graph 602 is translated into a set of constraints 606. The set of constraints 606 may include legal address constraints, interference constraints for the interference edges of interference graph 602, and architectural constraints associated with the accelerator executing the neural network. It should be noted that because the tensors are multidimensional and the scratchpad memory can also be organized in multiple dimensions, the address constraints will include constraints in multiple dimensions.

At operation 608, a constraints solver such as a SMT solver can be used to provide address assignments for the tensors in interference graph 602 that can satisfy the set of constraints 606. If the constraints solver is able to find a solution that satisfies all the constraints, a set of address assignments 610 can be generated to map the tensors to memory locations in the scratchpad memory. It should be noted that the array elements of a tensor are no allocated individually. Instead, a modulo allocation can be performed to assign addresses to the individual elements of a tensor. By way of example, for a n-dimensional array A [S0, S1, S2, . . . ] with data elements S0, S1, S2, . . . , the address of each element A [i0, i1, i2, . . . ] can be calculated based on a quasi-affine expression:
$addr(A[i0, i1, i2, . . . ])=base(A)+c0*(10\% \ m0)+c1*(i1\% \ m1)+c2*(12\% \ m2)+. . .$, where m0, m1, m2 . . . is calculated based on loop-carried dependency, and $1<=m1<=S1$, and where c0, c1, c2, . . . is calculated based on m0, m1, m2, . . . , etc.

If the constraints solver is unable to satisfy all the constraints, the unsatisfied constraints form an unsatisfied core 612. At operation 614, unsatisfied core 612 is translated into a set of spill candidates 616. A spill candidate can be selected using a similar process as described above. Interference graph 602 can be updated to take into account the additional spill operation, and an updated set of constraints can be provided to the constraints solver to iteratively perform address assignment until a set of valid address assignments and associated spill operations are generated.

Although address assignment process 600 can be used, the problem posed to the constraints solver is NP-complete. For larger interference graphs, the processing time to find a suitable address assignment solution can be significant. As such, certain optimizations can be performed to reduce the problem provided to the constraints solver by simplifying some of the constraints. Referring to the interference constraint above, the constraint for an interference edge of (LR (i), LR (j)) in one dimension is structured as two alternative constraints:

$$addr\_i + alloc\_size\_i <= addr\_j \ or \ addr\_j + alloc\_size\_j <= addr\_i$$

In the final address assignment, only one of these constraints need to be true and satisfied. By choosing one of these constraints (e.g., using heuristics), the interference graph can be converted into a directed interference graph. This reduces the problem to a system of difference constraints (SDC), which can be solved in P-complete time. Selecting one of the constraints in the pair is analogous to selecting a direction for the interference graph. To convert the interference graph into a directed interference graph, a feasibility test is performed on the selected direction. The feasibility test may include performing a cycle check to verify that the directed interference graph is a directed acyclic graph that does not contain any cycle based on the selected direction (e.g., 'addr_i+alloc_size_i<=addr_j' versus 'addr_j+alloc_size_j<=addr_i'), and a longest path check to verify that the weight longest path in the directed acyclic graph is less than the size of the scratchpad memory in which the edge weight is alloc_size_i for edge 'addr_i+ alloc_size_i<=addr_j'.

FIG. 7 illustrates an example of a directed interference graph 702 that contains a cycle after selecting a direction for an edge and adding the directed edge. Because the selected direction resulted in a cycle, the constraint is not feasible for SDC. In such scenarios, the alternative direction or constraint can be selected for an edge. If the alternative direction also results in a cycle, the edge is considered an undecided edge, and is not added to the directed interference graph.

FIG. 7 also illustrates another example of a directed interference graph 704 that does not contain a cycle. Directed interference graph 704 passes the cycle check, and this is the longest path check that is performed. The SDC is infeasible when the longest path is bigger than the buffer size. For example, the SDC is not feasible when the sum of alloca_size_i, alloca_size_j, alloca_size_k exceeds buffer_size. To facilitate the longest path verification, a super source (ssrc) and super sink (snkk) can be added to represent the constraints 0<addr_i, and addr_k+ alloc_size_k<=buffer_size, respectively.

Figure 8:
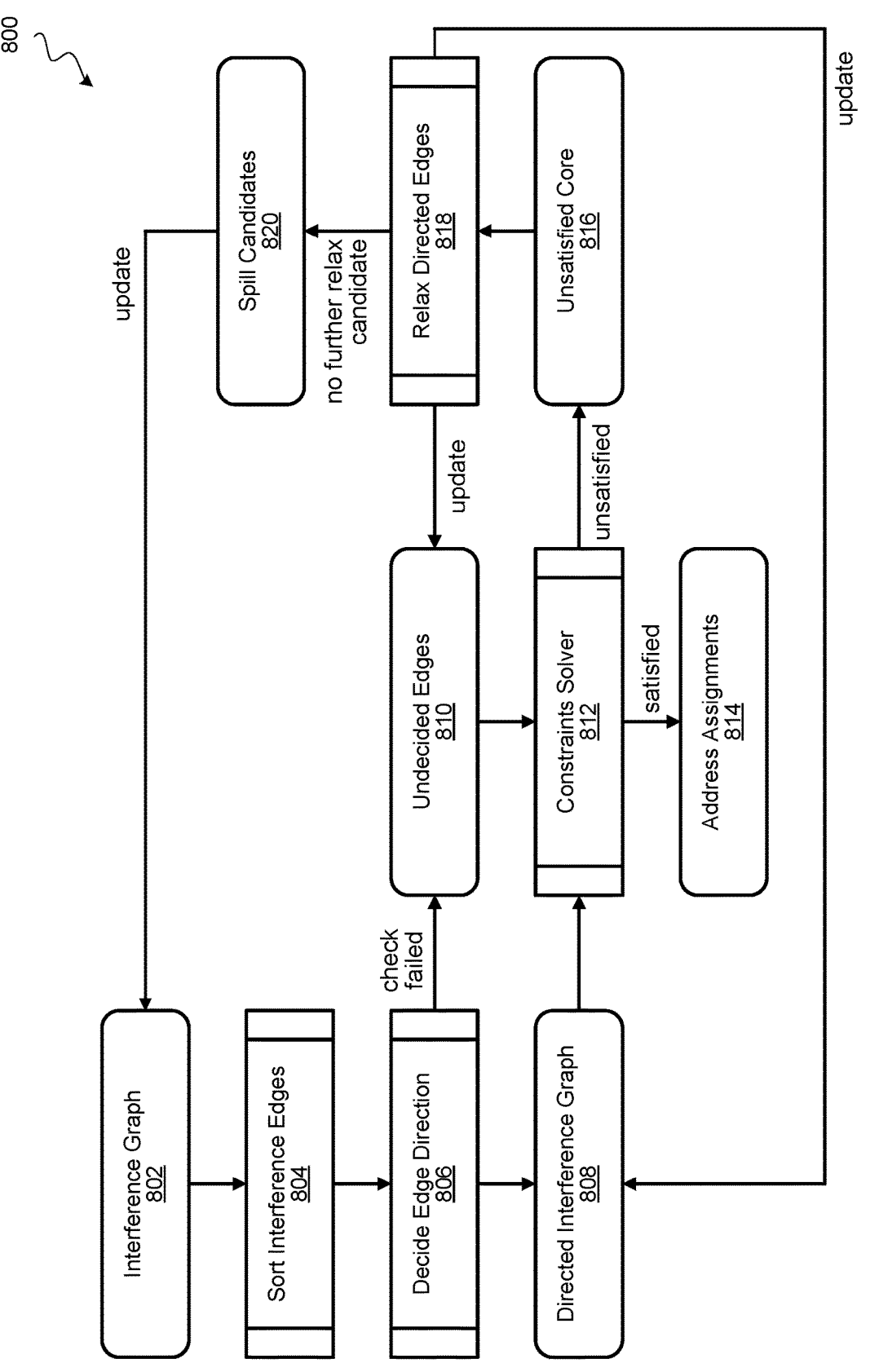
FIG. 8 illustrates a flow diagram of an example workflow of a modified address assignment process.

FIG. 8 illustrates a flow diagram of an example of the workflow of a modified address assignment process 800 that can be used to reduce the compilation processing time. In some implementations, address assignment process 800 can be used, for example, to implement operation 310. Similar to process 600, address assignment process 800 may begin with an interference graph 802 generated based on the live range conflicts.

At operation 804, the interference edges from interference graph 802 can be sorted using heuristics (e.g., amount of live range overlap, etc.) such that the decisions can be made for each edge to add them one by one to a directed interference graph. In some implementations, the nodes of interference graph 802 can be sorted first (e.g., tensor size, live range), and the edges can be sorted according to the node ordering.

At operation 806, for each of the interference edge from interference graph 802 in sorted order, a direction for the edge is selected and added as a directed edge into the directed interference graph 808. A feasibility test is performed on the edge to verify that the chosen direction passes the cycle check and the longest path check. A single source longest path from the ssrc and ssnk is maintained to enable fast longest path checks, and to also enable incremental longest path update after each new directed edge is added to the directed interference graph 808. If either the cycle check or the longest path check fails, the interference edge is rejected from the directed interference graph 808, and the rejected edge is added to a set of undecided edges 810

After all edges from interference graph 802 has been processed, directed interference graph 808 will include edges that pass the feasibility test, and the set of undecided edges 810 will include edges that did not pass the feasibility test. Once the set of undecided edges have been identified, at operation 812, a constraints solver such as a SMT solver can be used to determine the direction of the undecided edges. The set of constraints provided to the constraints solver includes constraints set by the directed interference graph 808, and the constraints associated with the set of undecide edges 810.

If the constraints solver is able to find a solution that satisfies all the constraints, a set of address assignments 814 can be generated to map the tensors to memory locations in the scratchpad memory. If the constraints solver is unable to satisfy all the constraints, the unsatisfied constraints form an unsatisfied core 816. At operation 818, a directed edge from the directed interference graph 808 is removed to relax the constraints provided to the constraints solver, and the removed edge is added to the set of undecided edges 810. The constraints solver can be invoked again to solve the updated constraints. This process can be iteratively performed until no further edges from the directed interference graph 808 can be relaxed. At that point, spill candidates can be identified from the unsatisfied core. After select a tensor to spill, the interference graph 802 can be updated to take into account the additional spill operation, and process 800 is performed again for the updated interference graph until a combination of valid address assignments and spill operations is found.

Figure 9:
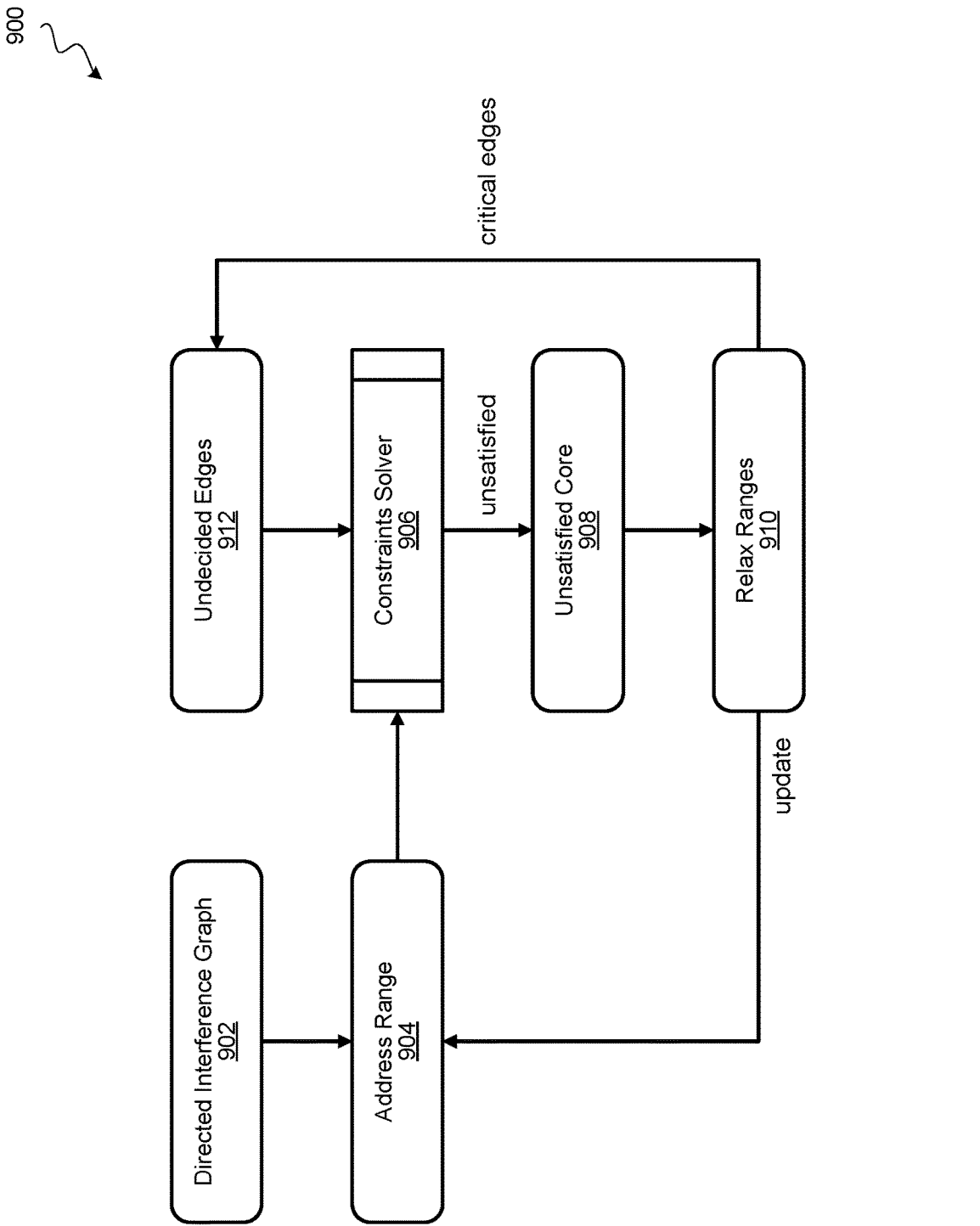
FIG. 9 illustrates a flow diagram of an example workflow for resolving undecided edges.

FIG. 9 illustrates a flow diagram of an example of the workflow of a process 900 to analyze undecided edges. Process 900 may begin with a directed interference graph 902 (e.g., directed interference graph 808) that contains edges passing the SDC feasibility test. Instead of translating the whole directed interference graph into constraints, the address range 904 of a subset of nodes can be translated into constraints. Specifically, this subset of nodes is defined by all nodes referred to by the set of undecided edges 912. The address range constraint can be defined as 'min_addr_i<=addr_i<=max_addr_i', where min_addr_i is calculated by the single-source longest path from ssre to node i, and max_addr_i calculated by the single-source longest path from the ssnk to node i. These address range constraints summarize the effect of the directed interference graph 902 on the nodes referred by the undecided edges 912, and results in a much smaller number of constraints.

At operation 906, the address range constraints for the address range 904 of the subset of nodes, and the constraints from the set of undecided edges 912 are provided to a constraints solver (e.g., SMT solver). If the set of constraints is satisfiable, the address assignment is performed according to the solution provided by the solver. If the constraints solver is unable to satisfy all the constraints, an unsatisfiable core 908 for the address range constraints is obtained.

Based on the constraints from unsatisfiable core 908, either min_addr_i or max_addr_i can be relaxed by removing an edge from the corresponding longest path span tree, and removed edge can be added to the set of undecided edges 912. This relaxation is not possible when the edge in the longest path span tree is connecting the ssre or ssnk, because removing such an edge will result in an illegal address assignment. In this case, a spill candidate can be identified to update the interference graph, and the process can be repeated.

FIG. 10 illustrates a flow diagram of an example of a process 1000 for compiling a neural network model. Process 1000 can be performed, for example, by a compiler that interprets programming code describing the neural network model, and translates the programming code into machine instructions for execution on hardware (e.g., an integrated circuit device such as a neural network accelerator or an acceleration engine). In some implementations, process 1000 can be implemented on a computer-readable medium that is executable by one or more processors of a computing system to compile the programming code of a neural network model for loading onto the integrated circuit device for execution.

Process 1000 may begin by obtaining a description of a neural network model at block 1002. The description of the neural network model can be, for example, source code written in a high-level programming language, such as Python, Java, C++, among other examples. In some implementations, the description of the neural network model may utilize software libraries tailored for neural networks such as TensorFlow, PyTorch, etc. An intermediate representation (IR) from the description of a neural network model (source code) can be generated to expanding operators in the source code into loopnests.

At block 1004, the loop-level live intervals of the tensors in the neural network model are determined. The loop-level live interval may start at the instruction in which any element of the tensor is first written, and end at the instruction in which any element of the tensor is last read. In some implementations, each loop-level live interval can be represented using an affine schedule for the corresponding tensor. The affine schedule can be used to represent loop-level live interval without having to unroll the loopnests. In some implementations, to avoid having to compare affine expressions for the dynamic instances in the iteration domains, the loop indices in the affine schedule can be replaced with numeric values as described above.

At block 1006, a timestamp having the largest memory usage that exceeds a size of a scratchpad memory (e.g., a buffer memory such as a state buffer of the neural network accelerator) can be identified based on the loop-level live intervals. For example, a linear scan of the live intervals of the tensors can be performed to estimate the memory usage at each timestamp. The timestamp having the largest memory usage or largest memory pressure that exceeds the size of the scratchpad memory can be selected for further processing.

At block 1008, tensor candidates are identified for spilling to external memory such that the memory usage at the identified timestamp can be reduced to be below the size of the scratchpad memory. The tensor candidates may correspond to the set of tensors that are live at the identified timestamp. At block 1010, one or more tensor candidates can be selected for spilling based on one or more heuristics. The one or more heuristics can include the tensor size and the loop-level live interval of each tensor candidate, or other metrics such as a ratio of the tensor size to the loop-level live interval. This process can be iteratively performed until the memory usage or memory pressure at all timestamps fall below the size of the scratchpad memory.

At block 1012, address assignments can be performed for the scratchpad memory to store the remaining tensors that have not been selected for spilling. In some implementations, the address assignment may include generating a directed interference graph and a set of undecided edges for the tensors that have not been selected for spilling, and providing constraints from the directed interference graph and the set of undecided edges to a constraints solver. The address assignments process may also include identifying an additional tensor from the remaining tensors to spill based on a constraint that the solver fails to satisfy. An example of a constraints solver that can be used includes a SMT solver. The process of identifying additional tensors to spill at block 1012 can be iteratively performed, and the constraints provided to the solver can be updated accordingly until a set of valid address assignments are generated for tensors that are not being spilled to external memory.

At block 1014, machine instructions for executing the neural network model on an integrated circuit device can be generated based on the address assignments generated at block 1012, and the spill operations identified at blocks 1010 and 1012 for the tensors of the neural network model. For example, the generated machine instructions can be in the form of compiled code in a binary format that can be loaded onto the integrated circuit device for execution.

FIG. 11 illustrates a flow diagram of an example of a process 1100 for performing address assignment for a buffer memory. Process 1100 can be performed, for example, during compilation of a neural network model by a compiler, and can be implemented as part of block 1012 in process 1000. In some implementations, process 1100 can be implemented on a computer-readable medium that is executable by one or more processors of a computing system to compile the programming code of a neural network model for loading onto the integrated circuit device for execution.

Process 1100 may begin at block 1112 by obtaining an interference graph of tensors of a neural network model for storing in the buffer memory. The buffer memory can be, for example, a state buffer of a neural network accelerator. The interference graph can be obtained after determining an initial set of tensors to spill at timestamps of the execution flow having a memory usage estimation exceeding the size of the buffer memory. The memory usage estimation can be determined, for example, based on loop-level live intervals of the tensors represented as affine schedules. In some implementations, the loop-level live intervals can be approximated by replacing iteration variables in the affine schedules with numeric values. The set of tensors provided in the interference graph obtained at block 1112 can theoretically fit the buffer memory. However, because the tensors may have non-uniform sizes and the hardware executing the neural network model may have certain architectural constraints, additional spills may be needed to obtain a valid address assignment.

At block 1114, a set of directed edges and a set of undecided edges in the interference graph are determined, and at block 1116, a directed interference graph is generated from the set of directed edges. In some implementations, the set of directed edges includes edges in the interference graph that are each between a pair of tensors in which a live range of a first tensor in the pair completely overlaps a live range of a second tensor in the pair. In some implementations, the set of undecided edges includes edges in the interference graph that are each between a pair of tensors in which a live range of a first tensor in the pair partially overlaps a live range of a second tensor in the pair.

Forming the directed interference graph at block 1116 may include sorting the set of directed edges into an order based on a set of one or more heuristics, and performing a set of operations on each of the directed edges in the sorted order. The set of operations may include selecting a direction for a directed edge, and adding the directed edge to the directed interference graph. In some implementations, a feasibility test is performed on the edge before adding it to the directed interference graph. The feasibility test may include verifying that the longest path in the directed interference graph including the edge under consideration is less than a size of the buffer memory, and/or verifying that the directed interference graph including the edge under consideration passes a cycle check to confirm that the directed interference graph does not contain a cycle (e.g., the directed interference graph corresponds to a directed acyclic graph).

At block 1118, constraints based on the directed interference graph and the set of undecided edges are provided to a constraints solver (e.g., SMT solver) to assign addresses in the buffer memory for storing the tensors of the neural network model. In some implementations, the addresses assignment attempt may result in an unsatisfiable core. In such scenarios, additional iterations of the address assignment can be performed by updating the directed interference graph to remove one or more directed edges from the directed interference graph, and updating the set of undecided edges to include the removed one or more directed edges. Updated constraints from the updated directed interference graph and the updated set of undecided edges are provided to the constraints solver for address assignment. When a constraint remains unsatisfiable after removing all removable directed edges from the directed interference graph, a spill candidate associated with the unsatisfiable constraint can be identified, and the interference graph is updated by removing the spill candidate associated with the constraint from the interference graph. Process 1100 can be iteratively performed until the constraints solver finds a valid address assignment solution, with each iteration adding a spill operation.

Figure 12:
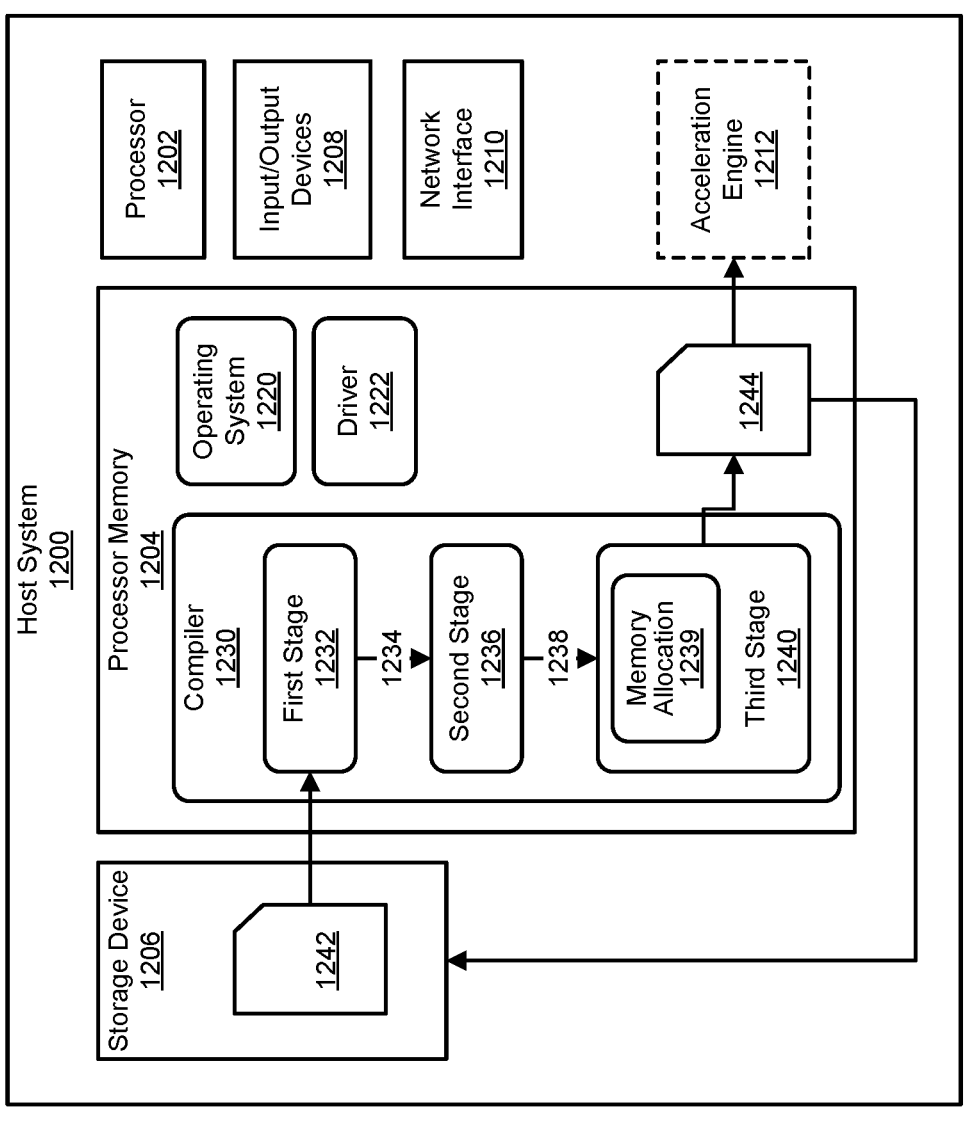
FIG. 12 illustrates a block diagram of an example of a compiler in a host system.

FIG. 12 illustrates a block diagram of an example of a host system 1200 on which a compiler 1230 can run. The illustrated host system 1200 is an example of a computing device, and includes a processor 1202, a processor memory 1204, at least one storage device 1206, various Input/Output (I/O) devices 1208, and at least one network interface 1210. In the example of FIG. 12, the host system 1200 also includes an acceleration engine 1212, which is an integrated circuit device that can accelerate certain operations or computations performed by the host system 1200. In various examples, the host system 1200 can be implemented as a server in a data center, a desktop computer, a laptop computer, a tablet computer, or a smartphone, among other examples. In some examples, operations or components discussed below as being performed or included in the host system 1200 can be performed or included in other computer devices. For example, the compiler 1230 can execute on the host system 1200 while the acceleration engine 1212 is located in a different host system or different computing device.

The processor 1202 is an integrated circuit device that can execute program code, in the form of instructions. The program code can be for various software applications or tools, such as an operating system 1220 or the illustrated compiler 1230. While the processor 1202 is executing a program, the instructions for the program can be stored in the processor memory 1204. The instructions can also be stored elsewhere, such as on the storage device 1206, and can be loaded into the processor memory 1204 when needed by the processor 1202. The processor 1202 can also use the processor memory 1204 for temporary storage of other data that the processor 1202 is operating on. In various examples, the processor memory 1204 is a volatile memory type, such as a type of random access memory, though non-volatile memory types can, alternatively or additionally, be used for the processor memory 1204.

The storage device 1206 is an example of a device that can include non-volatile memory. For example, the storage device 1206 can be a magnetic disk drive, a solid-state drive, or an optical drive, among other examples. Program code and other data stored on the storage device 1206 can remain present when the storage device 1206 is not powered on. Storage device 1206 can be uses as a type of non-transitory storage medium, or may include a reader that can access non-transitory storage medium.

The storage device 1206 is one example of a peripheral device. A peripheral device is a component that can be coupled to the host system 1200 to add functionality to the host system 1200. Other examples of peripheral devices include Input/Output devices 1208 and network interface 1210. The Input/Output devices 1208 can include user input and/or output devices, such as keyboard, mouse, pointer, touchpad, touchscreen, microphone, display screen, speaker, printer, and scanner, among other examples. Network interface 1210, which can be implemented using a network interface card, can provide access to one or more networks. Network interface 1210 can include, for example, a physical port for connecting a network cable and/or one or more antennas and/or radios for wireless communication such as Wi-Fi, cellular, and/or other over-the-air networks. Network interface 1210 can also be described as an I/O device.

The acceleration engine 1212 is also another type of peripheral device or I/O device. The acceleration engine 1212 is a device that is purpose-built to perform certain operations that can be performed by the processor 1202, but can be performed faster by the acceleration engine 1212. For example, the acceleration engine 1212 can be a neural network accelerator that is capable of performing large scale, parallel computations of a neural network more efficiently than when the computations are performed by the processor 1202. As another example, the acceleration engine 1212 can be a graphics processing unit (GPU), and may be optimized to perform the computations needed for graphics rendering. Other examples of devices that can be implemented by the acceleration engine 1212 include cryptographic accelerators, compression and decompression accelerators, 3-D accelerators, regular expression accelerators, security accelerators, and others.

In various examples, the acceleration engine 1212 can execute program code to perform certain operations. For example, when the acceleration engine 1212 is a neural network accelerator, the acceleration engine 1212 can be programmed to execute a particular neural network model, such as one that performs image recognition or one that performs machine translation. As a further example, to support the execution of a neural network model, the acceleration engine 1212 can be programed to perform operations such as copying data for the neural network between processor memory 1204 and the acceleration engine 1212 (e.g., copying input data for the neural network from processor memory 1204 into the acceleration engine 1212, copying results from the acceleration engine 1212 into the processor memory 1204, etc.).

To generate program code for the acceleration engine 1212, the host system 1200 can execute the compiler 1230. Compilers, in general, are software programs that translate program code written in a human-readable language into a format (e.g., machine instructions) that can be read and processed by an integrated circuit device. In the example of FIG. 12, the acceleration engine 1212 can be a neural network accelerator, and the compiler 1230 can be a compiler for compiling a neural network description into instructions to be executed by the acceleration engine 1212. When the acceleration engine 1212 implements a different type of accelerator, a different compiler can be used.

The compiler 1230 can be activated, for example, when the operating system 1220 receives keyboard, mouse, touchscreen, voice command, or other inputs from the Input/Output devices 1208. The inputs can further include parameters for the compiler 1230, such as input code 1242 to compile and configuration options for the compilation process. Once the compiler 1230 is activated, the processor 1202 can load the instructions for the compiler 1230 into the processor memory 1204, and execute the compiler from the processor memory 1204. In some implementations, compiler 1230 may identifying steps to be performed by the processor 1202, rather than by the acceleration engine 1212. For example, the processor 1202, through the execution of a driver 1222, may need to perform steps such as configuring Direct Memory Access (DMA) descriptors for moving data into or out of the acceleration engine 1212, among other examples.

In the example of FIG. 12, the compiler 1230 includes a first stage 1232, a second stage 1236, and a third stage 1240, which each perform different operations to produce compiled code 1244. In other examples, the compiler 1230 can combine the operations of the first stage 1232, second stage 1236, and/or third stage 1240 into fewer stages, or can divide the operations of one or more of the stages into multiple stages. In some implementations, compiler 1230 can also be modified such that certain operation(s) from one stage can be executed in a different stage.

The first stage 1232 (may also be referred to as the front stage) can receive and process input code 1242. The input code 1242 can describe a program in a high-level programming language, such as Python, Java, C++, among other examples, and may utilize software libraries tailored for neural networks such as TensorFlow, PyTorch, etc. The input code 1242 can be a description of a neural network model that describe, for example, steps to perform image recognition, speech recognition, machine translation, or other operations. The input code 1242 can be obtained from the storage device 1206. Alternatively, though not illustrated, the input code 1242 can be located in the processor memory 1204, or can be obtained from a network location using the network interface 1210.

Processing of the input code 1242 can include parsing the input code 1242, performing syntax and semantic analysis on the input code 1242 to identify operators (e.g., operations such as computations, memory accesses, and/or other functions, etc.) described in the input code 1242, and sorting the operators described in the input code 1242. For example, the operators described in the input code 1242 can be sorted into layers, where the outputs of one layer provide the inputs to a next layer. The output of the first stage 1232 can be an intermediate representation (IR) 1234 of the input code 1242. In some implementations, the IR 1234 can be code representing a compute graph (e.g., data flow graph, data dependency graph, etc.). The compute graph may include nodes and edges connecting the nodes. The nodes may represent operators such as computations, data rearrangements such as transformations, memory accesses, and/or other operations; and the edges or connections between the nodes may represent dependencies between the nodes, such as data dependencies, memory dependencies, or operational dependencies, among other examples. The compute graph can be organized, for example, in the layers, nodes, and connections between nodes of a neural network model.

The second stage 1236 (may also be referred to as the middle-end stage) can perform intermediate processing on the IR 1234 output from the first stage 1232. The intermediate processing may include performing various optimizations on the IR 1234. The optimizations may include target independent optimizations that are hardware agnostic, and/or target specific optimizations that are tailored for the hardware architecture executing the program of input code 1242. Target independent optimizations may include algebraic simplification, graph minimization such as removal of unnecessary or redundant operations and/or dependencies, high-level dependency optimization by rearranging operators to improve compute latencies, etc.

Target specific optimizations include optimizations that take into account the capabilities of the hardware (e.g., acceleration engine 1212) that the input code is being compiled for. Such optimizations may include operators fusion to fuse multiple operators into an execution kernel supported by the hardware, data layout transformation to efficiently fit data into the hardware, etc. The target specific optimizations may take into account considerations such as whether the operations being performed in any one layer, or at any one node in a layer, may be too many for the acceleration engine 1212 to perform at the same time. The acceleration engine 1212 may, for example, have a limited amount of local storage space for the data needed for a computation, or the computations may be more than the acceleration engine 1212 can perform at one time. In such scenario, the operators of the layer or node can be broken down into smaller operations, which can fit into the acceleration engine's local memory and/or can fit into the computing capacity of the acceleration engine 1212. The output of the second stage 1236 can be an optimized IR 1238 such as code representing an optimized compute graph.

The third stage 1240 (may also be referred to as the back-end stage) can operate on the output 1238 of the second stage 1236, and perform various steps before producing the instructions (e.g., machine code) that are to be executed by the acceleration engine 1212. These steps can include instruction and data scheduling, register allocation, and/or code generation. Instruction and data scheduling determines the order in which instructions are executed and data are processed by the acceleration engine 1212, and may include low-level dependency optimization by rearranging operations to improve parallel execution, handling dependencies between nodes by inserting synchronization instructions into the code, etc. Register allocation may include identifying optimizations in register usage and/or memory bandwidth usage to avoid spilling, and reordering of register and/or memory accesses to hide access latencies given the memory capacity of the hardware, etc. The third stage may include memory allocation module 1239, which performs memory allocation and address assignment for the buffer memory of an accelerator as described herein. Code generation converts the low-level optimized IR into machine code executable by the acceleration engine 1212, and includes mapping operations into hardware instructions according to the architecture of the acceleration engine 1212. The output of the third stage 1240 is compiled code 1244, which may include machine instructions in binary format. In some examples, the compiled code 1244 can be stored in the processor memory 1204. Alternatively or additionally, the compiled code 1244 can be copied to the storage device 1206 or to a network location. As noted above, the acceleration engine 1212 may be located at a different host system, in which case the compiled code 1244 can be sent over the network interface 1210 to the other host system.

In the example of FIG. 12, the host system 1200 can be executing a driver 1222, which can also be referred to as a device driver or runtime driver, that manages the acceleration engine 1212. The driver 1222 can provide an interface between applications executing on the host system 1200 (or on another host system) and the acceleration engine 1212. For example, the driver 1222 can provide an Application Program Interface (API) that defines functions for feeding input data to the acceleration engine 1212 and defining the operation to perform on the input data. In this and other examples, the driver 1222 can configure the acceleration engine 1212 to perform the operation. For example, the driver 1222 can identify a neural network model that the acceleration engine 1212 is to execute, as well as the location in the processor memory 1204 or on the storage device 1206 where the compiled code 1244 for the neural network model is located. The driver 1222 can further load into the acceleration engine 1212 or cause the acceleration engine 1212 to load the compiled code 1244, can load or cause the acceleration engine 1212 to load the input data on which the neural network model is to operate, and/or can cause the acceleration engine 1212 to begin executing on the input data. Once the acceleration engine 1212 has finished, the acceleration engine 1212 can notify the driver 1222, and the driver 1222 can deliver a result back to the application that requested the result.

Figure 13:
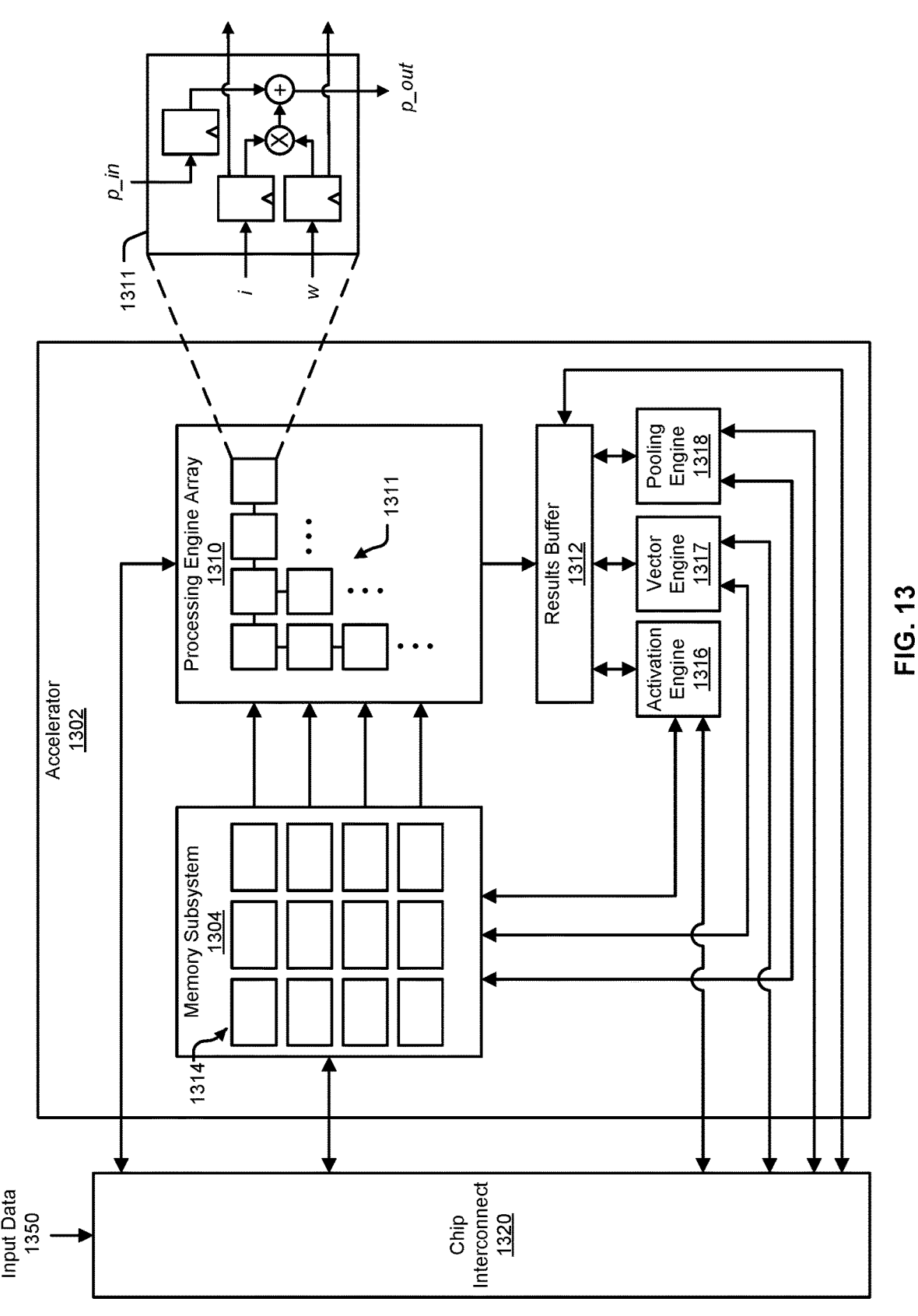
FIG. 13 illustrates a block diagram of an example of an integrated circuit device.

FIG. 13 is a block diagram illustrating an example of an integrated circuit device that can include an accelerator 1302. In various examples, the accelerator 1302, for a set of input data (e.g., input data 1350), can execute computations using a processing engine array 1310, an activation engine 1316, a vector engine 1317, and/or a pooling engine 1318. In some examples, the example accelerator 1302 may be an integrated circuit component of a processor, such as a neural network processor. The processor may have other integrated circuit components, including additional accelerator engines.

In various implementations, the memory subsystem 1304 can include multiple memory banks 1314. Memory subsystem 1304 can also be referred to as a state buffer or a scratchpad memory. In these implementations, each memory bank 1314 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 1314. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 1304 can permit simultaneous access to the read or write channels of multiple memory banks. As another example, the memory subsystem 1304 can include arbitration logic such that arbitration between, for example, the outputs of multiple memory banks

1314 can result in more than one memory bank's output being used. In these and other examples, though globally managed by the memory subsystem 1304, each memory bank can be operated independently of any other.

Having the memory banks 1314 be independently accessible can increase the efficiency of the accelerator 1302. For example, values can be simultaneously read and provided to each row of the processing engine array 1310, so that the entire processing engine array 1310 can be in use in one clock cycle. As another example, the memory banks 1314 can be read at the same time that results computed by the processing engine array 1310 are written to the memory subsystem 1304. In contrast, a single memory may be able to service only one read or write at a time. With a single memory, multiple clock cycles can be required, for example, to read input data for each row of the processing engine array 1310 before the processing engine array 1310 can be started.

In various implementations, the memory subsystem 1304 can be configured to simultaneously service multiple clients, including the processing engine array 1310, the activation engine 1316, the vector engine 1317, the pooling engine 1318, and any external clients that access the memory subsystem 1304 over a communication fabric 1320. In some implementations, being able to service multiple clients can mean that the memory subsystem 1304 has at least as many memory banks as there are clients. In some cases, each row of the processing engine array 1310 can count as a separate client. In some cases, each column of the processing engine array 1310 can output a result, such that each column can count as a separate write client. In some cases, output from the processing engine array 1310 can be written into the memory banks 1314 that can then subsequently provide input data for the processing engine array 1310. As another example, the activation engine 1316, the vector engine 1317, and the pooling engine 1318 can include multiple execution channels, each of which can be separate memory clients. The memory banks 1314 can be implemented, for example, using static random access memory (SRAM).

In various implementations, the memory subsystem 1304 can include control logic. The control logic can, for example, keep track of the address spaces of each of the memory banks 1314, identify memory banks 1314 to read from or write to, and/or move data between the memory banks 1314. In some implementations, memory banks 1314 can be hardwired to particular clients. For example, a set of memory banks 1314 can be hardwired to provide values to the rows of the processing engine array 1310, with one memory bank servicing each row. As another example, a set of memory banks can be hard wired to receive values from columns of the processing engine array 1310, with one memory bank receiving data for each column.

The processing engine array 1310 is the computation matrix of the example accelerator 1302. The processing engine array 1310 can, for example, execute parallel integration, convolution, correlation, and/or matrix multiplication, among other things. The processing engine array 1310 includes multiple processing engines 1311, arranged in rows and columns, such that results output by one processing engine 1311 can be input directly into another processing engine 1311. Processing engines 1311 that are not on the outside edges of the processing engine array 1310 thus can receive data to operate on from other processing engines 1311, rather than from the memory subsystem 1304.

In various examples, the processing engine array 1310 uses systolic execution, in which data arrives at each processing engine 1311 from different directions at regular intervals. In some examples, input data can flow into the processing engine array 1310 from the left and weight values can be loaded at the top. In some examples weights and input data can flow from the left and partial sums can flow from top to bottom. In these and other examples, a multiply-and-accumulate operation moves through the processing engine array 1310 as a diagonal wave front, with data moving to the right and down across the array. Control signals can be input at the left at the same time as weights, and can flow across and down along with the computation.

In various implementations, the number of columns in the processing engine array 1310 determines the computational capacity of the processing engine array 1310, and the number of rows determines the required memory bandwidth for achieving maximum utilization of the processing engine array 1310. The processing engine array 1310 can have, for example, 64 columns and 128 rows, or some other number of columns and/or rows.

An example of a processing engine 1311 is illustrated in FIG. 13 in an inset diagram. As illustrated by this example, a processing engine 1311 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 1311.

In the illustrated example, an input from above can include a partial sum, p_in, provided either from another processing engine 1311 or from a previous round of computation by the processing engine array 1310. When starting a computation for a new set of input data, the top row of the processing engine array 1310 can receive a fixed value for p_in, such as zero. As illustrated by this example, i and w are multiplied together and the result is summed with p_in to produce a new partial sum, p out, which can be input into another processing engine 1311. Various other implementations of the processing engine 1311 are possible.

Outputs from the last row in the processing engine array 1310 can be temporarily stored in the results buffer 1312. The results can be intermediate results, which can be written to the memory banks 1314 to be provided to the processing engine array 1310 for additional computation. Alternatively, the results can be final results, which, once written to the memory banks 1314 can be read from the memory subsystem 1304 over the communication fabric 1320, to be output by the system.

In some implementations, the accelerator 1302 includes an activation engine 1316. In these implementations, the activation engine 1316 can combine the results from the processing engine array 1310 into one or more output activations. For example, for a convolutional neural network, convolutions from multiple channels can be summed to produce an output activation for a single channel. In other examples, accumulating results from one or more columns in the processing engine array 1310 may be needed to produce an output activation for a single node in the neural network. In some examples, activation engine 1316 can be bypassed.

In various examples, the activation engine 1316 can include multiple separate execution channels. In these examples, the execution channels can correspond to the columns of the processing engine array 1310, and can perform an operation on the outputs of a column, the result of which can be stored in the memory subsystem 1304. In these examples, the activation engine 1316 may be able to perform between 1 and n parallel computations, where n is equal to the number of columns in the processing engine array 1310. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 1302 can include a pooling engine 1318. Pooling is the combining of outputs of the columns of the processing engine array 1310. Combining can include for example, computing a maximum value, a minimum value, an average value, a median value, a summation, a multiplication, or another logical or mathematical combination. In various examples, the pooling engine 1318 can include multiple execution channels that can operating on values from corresponding columns of the processing engine array 1310. In these examples, the pooling engine 1318 may be able to perform between 1 and n parallel computations, where n is equal to the number of columns in the processing engine array 1310. In various examples, execution channels of the pooling engine 1318 can operate in parallel and/or simultaneously. In some examples, the pooling engine 1318 can be bypassed.

In some implementations, the accelerator 1302 can further include a vector engine 1317. Vector engine 1317 is a compute engine that can perform computations and manipulations on values stored in memory subsystem 1304 and/or results buffer 1312 such as values representing matrices of input values, weight values, intermediate results, etc. Vector engine 1317 can include multiple execution channels each with a pipeline of computation circuit blocks (e.g., arithmetic logic units) to perform complex computations such as nested multiply-and-add operations and/or complex manipulations such as sorting operations. In various examples, execution channels of the vector engine 1317 can operate in parallel and/or simultaneously. In some examples, the vector engine 1317 can be bypassed or be omitted.

Herein, the activation engine 1316, the vector engine 1317, and the pooling engine 1318 may be referred to collectively as execution engines. The processing engine array 1310 is another example of an execution engine. Another example of an execution engine is a Direct Memory Access (DMA) engine, which may be located outside the accelerator 1302.

Input data 1350 can arrive over the communication fabric 1320. The communication fabric 1320 can connect the accelerator 1302 to other components of a processor, such as a DMA engine that can obtain input data 1350 from an Input/Output (I/O) device, a storage drive, or a network interface. The input data 1350 can be, for example one-dimensional data, such as a character string or numerical sequence, or two-dimensional data, such as an array of pixel values for an image or frequency and amplitude values over time for an audio signal. In some examples, the input data 1350 can be three-dimensional, as may be the case with, for example, the situational information used by a self-driving car or virtual reality data. In some implementations, the memory subsystem 1304 can include a separate buffer for the input data 1350. In some implementations, the input data

1350 can be stored in the memory banks 1314 when the accelerator 1302 receives the input data 1350.

In some examples, the accelerator 1302 can implement a neural network processing engine. In these examples, the accelerator 1302, for a set of input data 1350, can execute a neural network to perform a task for which the neural network was trained. Executing a neural network on a set of input data can be referred to as inference or performing inference.

The weights for the neural network can be stored in the memory subsystem 1304, along with input data 1350 on which the neural network will operate. The neural network can also include instructions, which can program the processing engine array 1310 to perform various computations on the weights and the input data. The instructions can also be stored in the memory subsystem 1304, in the memory banks 1314 or in a separate instruction buffer. The processing engine array 1310 can output intermediate results, which represent the outputs of individual layers of the neural network. In some cases, the activation engine 1316, the vector engine 1317, and/or pooling engine 1318 may be enabled for computations called for by certain layers of the neural network. The accelerator 1302 can store the intermediate results in the memory subsystem 1304 for inputting into the processing engine array 1310 to compute results for the next layer of the neural network. The processing engine array 1310 can further output final results from a last layer of the neural network. The final results can be stored in the memory subsystem 1304 and then be copied out to host processor memory or to another location.

Figure 14:
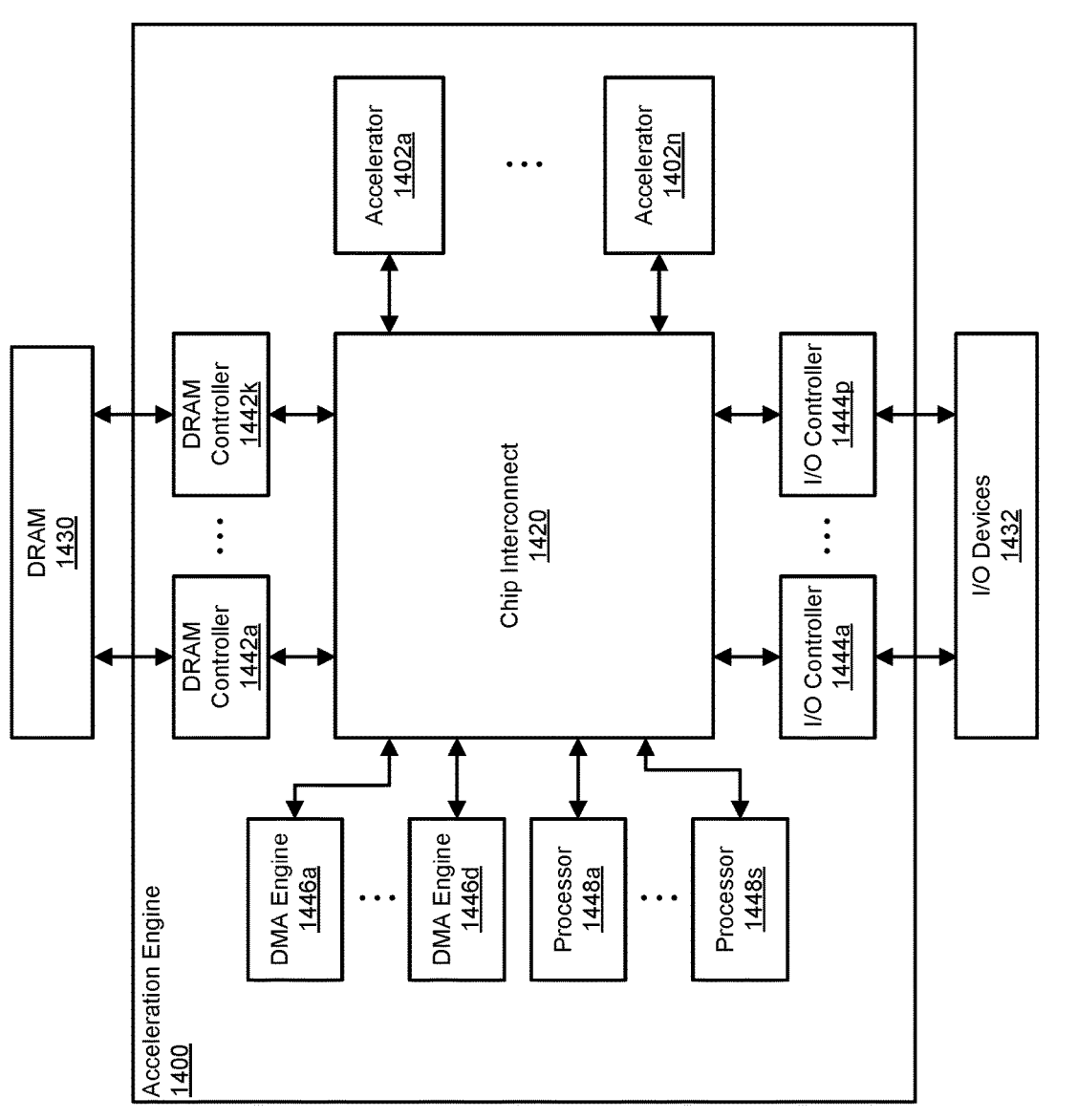
FIG. 14 illustrates a block diagram of an example of an acceleration engine.

FIG. 14 includes a block diagram that illustrates an example of an acceleration engine 1400. The acceleration engine 1400 is an example of an integrated circuit that can include one or more accelerators 1402a-1402n that may be similar to the accelerator illustrated in FIG. 13.

In the example of FIG. 14, the acceleration engine 1400 includes multiple accelerators 1402a-1402n, each of which can perform a set of operations. In various examples, the accelerators 1402a-1402n are for particular types of operations, so that the accelerators 1402a-1402n can perform the operations much faster than when similar operations are performed by a general-purpose processor. In various examples, to perform a set of operations, input data on which the operations are to be performed must first be moved into the accelerators 1402a-1402n. Additionally, in some cases, program code is also moved into the accelerators 1402a-1402n, which programs the operations that the accelerators 1402a-1402n will perform on the data. In the illustrated example, the acceleration engine 1400 includes n accelerators 1402a-1402n. Examples of accelerators that can be included in the acceleration engine 1400 include graphics accelerators, floating point accelerators, neural network accelerators, and others. In various examples, the accelerators 1402a-1402n can each be the same (e.g., each of the is a graphics accelerator) or can be different (e.g., the accelerators 1402a-1402n include a graphics accelerator, a floating point accelerator, and neural network accelerator).

The example acceleration engine 1400 further includes DRAM controllers 1442a-1442k for communicating with an external memory. The external memory is implemented, in this example, using DRAM 1430. In the illustrated example, the acceleration engine 1400 includes k DRAM controllers 1442a-1442k, each of which may be able to communicate with an independent set of banks of DRAM. In other examples, other types of RAM technology can be used for the external memory. The DRAM controllers 1442a-1442k can also be referred to as memory controllers.

In various examples, input data and/or program code for the accelerators 1402a-1402n can be stored in the DRAM 1430. Different programs can cause the accelerators 1402a-1402n to perform different operations. For example, when one of the accelerators is a neural network accelerator, one program can configure the neural network accelerator to perform speech recognition while another program can configure the neural network accelerator to perform image recognition. In various examples, different accelerators 1402a-1402n can be programmed with different programs, so that each performs a different set of operations. In various examples, the processors 1448a-1448s can manage moving of program code from the DRAM 1430 to the accelerators 1402a-1402n.

The example acceleration engine 1400 further includes I/O controllers 1444a-1444p for communicating with I/O devices 1432 in the system. The acceleration engine 1400 can communicate with I/O devices over, for example, a processor bus. In some examples, the processor bus can be implemented using Peripheral Component Interconnect (PCI) and/or a variation of the PCI bus protocol. The processor bus can connect the acceleration engine 1400 to I/O devices such as, for example, input and output devices, memory controllers, storage devices, and/or network interface cards, among other things. In some examples, the I/O controllers 1444-1444p can enable the acceleration engine 1400 to act as an I/O device for a host processor. For example, the acceleration engine 1400 can be the recipient of input data from the host processor, and a command indicating an operation to be performed on the input data (e.g., a particular computation or analysis). In the illustrated example, the acceleration engine 1400 includes p I/O controllers 1444a-1444p, each of which may include a separate root complex and may communicate with a separate set of I/O devices 1432. In other examples, other standardized bus protocols, such as Ultra Path Interconnect (UPI) can be used for the host bus. In other examples, a proprietary bus protocol can be used.

Movement of data in the acceleration engine 1400 can be managed by one or more processors 1448a-1448s, which can also be referred to as data management processors. In the example of FIG. 14, the acceleration engine 1400 includes s processors 1448a-1448s incorporated into the device (e.g., on the same silicon die). In other examples, the processors 1448a-1448s can be external to the acceleration engine 1400 (e.g., on a different die and/or in a different package). In some examples, the processors 1448a-1448s can manage the movement of data from I/O devices 1432 to the accelerators 1402a-1402n or the DRAM 1430. For example, input data may be located at an I/O device 1432 or in processor memory, and the processors 1448a-1448s can move the input from the I/O device 1432 or processor memory into an accelerator or into DRAM 1430. As another example, program code for the accelerators 1402a-1402n may be located on an I/O device 1432 or in processor memory.

The example acceleration engine 1400 further includes DMA engines 1446a-1446d that can move data between the accelerators 1402a-1402n, DRAM controllers 1442a-1442k, and I/O controllers 1444a-1444p. In the illustrated example, the acceleration engine 1400 includes d DMA engines 1446a-1446d. In some implementations, the DMA engines 1446a-1446d can be assigned to specific tasks, such as moving data from the DRAM controllers 1442a-1442d to the accelerators 1402a-1402n, or moving data between the I/O controllers 1444a-1444p and the accelerators 1402a-1402n. These tasks can be assigned, for example, by enqueueing descriptors with the DMA engines 1446a-1446d, where a descriptor identifies an address for a block of data and an operation (e.g., a read or a write) to perform. A descriptor, for example, can direct a DMA engine to instruct a DMA controller to read a block of data from DRAM 1430. A descriptor can, as a further example, instruct the DMA engine to write data, read by the DMA controller, to an accelerator. Further descriptors can be used to move data from an accelerator to DRAM 1430.

In various examples, each of the processors 1448a-1448s can be responsible for managing the data movement for a different accelerator. In some examples, a processor may manage the data movement for more than one accelerator. Similarly, in various examples, each of the processors 1448a-1448s can be assigned to one or more DMA engines 1446a-1446d. In these and other examples, associations between processors 1448a-1448s, accelerators 1402a-1402n, and DMA engines 1446a-1446d are determined by program code being executed by each respective processor.

In the example acceleration engine 1400, the various components can communicate over a chip interconnect 1420. The chip interconnect 1420 primarily includes wiring for routing data between the components of the acceleration engine 1400. In some cases, the chip interconnect 1420 can include a minimal amount of logic, such as multiplexors to control the direction of data, flip-flops for handling clock domain crossings, and timing logic.

Figure 15:
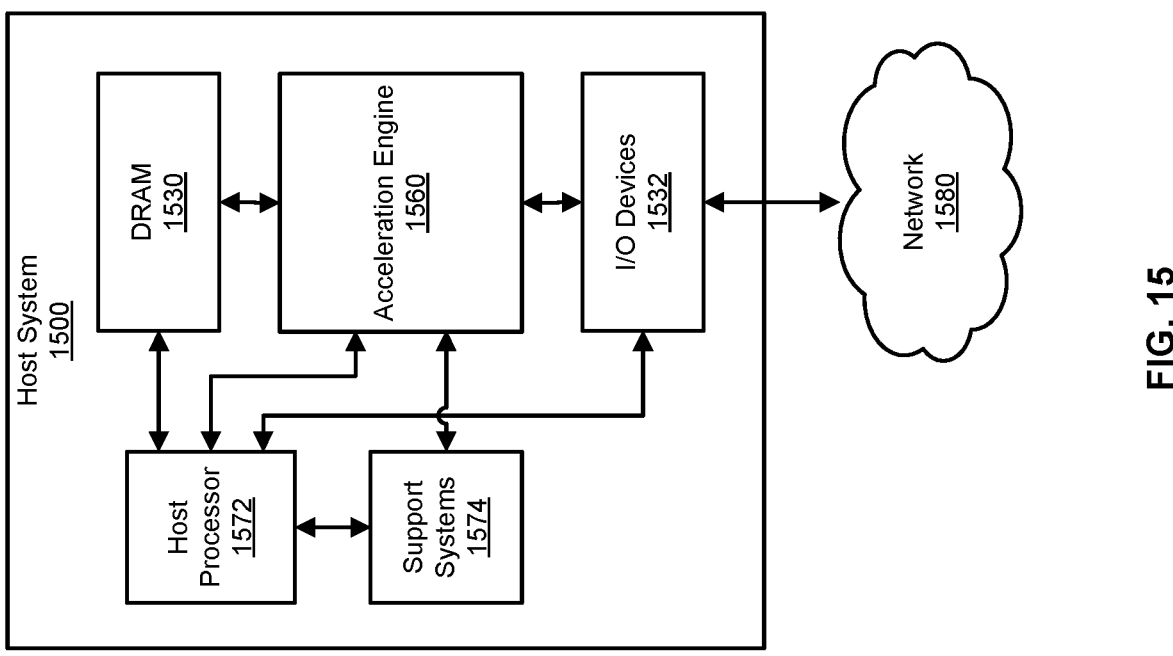
FIG. 15 illustrates a block diagram of an example of a host system.

FIG. 15 includes a block diagram that illustrates an example of a host system 1500 in which an acceleration engine 1560 can be used. The acceleration engine 1560 of FIG. 15 is an example of a device that can include one or more accelerators such as is illustrated in FIG. 14. The example host system 1500 of FIG. 15 includes the acceleration engine 1560, a host processor 1572, DRAM 1530 or processor memory, I/O devices 1532, and support systems 1574. In various implementations, the host system 1500 can include other hardware that is not illustrated here.

The host processor 1572 is a general-purpose integrated circuit that is capable of executing program instructions. In some examples, the host processor 1572 can include multiple processing cores. A multi-core processor may include multiple processing units within the same processor. In some examples, the host system 1500 can include more than one host processor 1572. In some examples, the host processor 1572 and the acceleration engine 1560 can be one chip, such as, one or more integrated circuits within the same package.

In various examples, the host processor 1572 can communicate with other components in the host system 1500 over one or more communication channels. For example, the host system 1500 can include a host processor bus, which the host processor 1572 can use to communicate with the DRAM 1530, for example. As another example, the host system 1500 can include an I/O bus, such as a PCI-based bus, over which the host processor 1572 can communicate with the acceleration engine 1560 and/or the I/O devices 1532, for example. In various examples, the host system 1500 can, alternatively or additionally, include other communication channels or busses, such as serial busses, power management busses, storage device busses, and so on.

In some examples, software programs executing on the host processor 1572 can receive or generate input for processing by the acceleration engine 1560. In some examples, the programs can select an appropriate neural network to execute for a given input. For example, a program may be for language translation, and can select one or more neural networks capable of speech recognition and/or machine translation. In these and other examples, the programs can configure the acceleration engine 1560 with the neural network to execute, and/or can select a neural network processing engine on the acceleration engine 1560 that has previously been configured to execute the desired neural network. In some examples, once the acceleration engine 1560 has started an inference on input data, the host processor 1572 can manage the movement of data (such as weights, instructions, intermediate results, results of conditional layers, and/or final results) into or out of the acceleration engine 1560.

In some examples, a software program that is using the acceleration engine 1560 to conduct an inference can read the result from a conditional layer from the acceleration engine 1560 and/or from a storage location, such as in DRAM 1530. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 1530 is memory that is used by the host processor 1572 for storage of program code that the host processor 1572 is in the process of executing, as well as values that are being operated on. In some examples, the data for a neural network (e.g., weight values, instructions, and other data) can be all or partially stored in the DRAM 1530. DRAM is a common term for processor memory, and though DRAM is volatile memory, processor memory can be volatile and/or non-volatile. Though not illustrated here, the host system 1500 can include other volatile and non-volatile memories for other purposes. For example, the host system 1500 can include a Read-Only Memory (ROM) that stores boot code for booting the host system 1500 at power on, and/or Basic Input/Output System (BIOS) code.

Though not illustrated here, the DRAM 1530 can store instructions for various programs, which can be loaded into and be executed by the host processor 1572. For example, the DRAM 1530 can be storing instructions for an operating system, one or more data stores, one or more application programs, one or more drivers, and/or services for implementing the features disclosed herein.

The operating system can manage and orchestrate the overall operation of the host system 1500, such as scheduling tasks, executing applications, and/or controller peripheral devices, among other operations. In some examples, a host system 1500 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 1500. For example, some drivers can provide communication between the operating system and peripheral devices or I/O devices 1532. Alternatively or additionally, some drivers may provide communication between application programs and the operating system, and/or application programs and peripheral devices accessible to the host system 1500. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 1532 can include hardware for connecting to user input and output devices, such as keyboards, mice, pens, tablets, voice input devices, touch input devices, displays or monitors, speakers, and printers, among other devices. The I/O devices 1532 can also include storage drives and/or network interfaces for connecting to a network 1580. For example, the host system 1500 can use a network interface to communicate with storage devices, user terminals, other computing devices or servers, and/or other networks, among various examples.

In various examples, one or more of the I/O devices 1532 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 1500 or may be in an external enclosure. A storage device can be fixed (e.g., attached by screws) or removable (e.g., having a physical release mechanism and possibly a hot-plug mechanism).

Storage devices, the DRAM 1530, and any other memory component in the host system 1500 are examples of computer-readable storage media. Computer-readable storage media are physical mediums that are capable of storing data in a format that can be read by a device such as the host processor 1572. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 1532 can be PCI-based devices. In these examples, a PCI-based I/O device includes a PCI interface for communicating with the host system 1500. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 1574 can include hardware for coordinating the operations of the acceleration engine 1560. For example, the support systems 1574 can include a microprocessor that coordinates the activities of the acceleration engine 1560, including moving data around on the acceleration engine 1560. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 1572. In some examples, the program executed by the microprocessor is stored on the hardware of microprocessor, or on a non-volatile memory chip in the host system 1500. In some examples, the microprocessor and the acceleration engine 1560 can be on chip, such as one integrated circuit on the same die and in the same package.

In some examples, the support systems 1574 can be responsible for taking instructions from the host processor 1572 when programs executing on the host processor 1572 request the execution of a neural network. For example, the host processor 1572 can provide the support systems 1574 with a set of input data and a task that is to be performed on the set of input data. In this example, the support systems 1574 can identify a neural network that can perform the task, and can program the acceleration engine 1560 to execute the neural network on the set of input data. In some examples, the support systems 1574 only needs to select an appropriate neural network processing engine of the neural network processor. In some examples, the support systems 1574 may need to load the data for the neural network onto the acceleration engine 1560 before the acceleration engine 1560 can start executing the neural network. In these and other examples, the support systems 1574 can further receive the output of executing the neural network, and provide the output back to the host processor 1572.

In some examples, the operations of the support systems 1574 can be handled by the host processor 1572. In these examples, the support systems 1574 may not be needed and can be omitted from the host system 1500.

In various examples, the host system 1500 can include a combination of host systems, processor nodes, storage subsystems, and I/O chassis that represent user devices, service provider computers or third-party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 1500 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer-implemented method for compiling a neural network model, the method comprising:
   obtaining a description of the neural network model;
   determining loop-level live intervals of tensors in the neural network model;
   identifying a timestamp having a largest memory usage that exceeds a size of a scratchpad memory based on the loop-level live intervals;
   identifying tensor candidates for spilling to external memory to reduce memory usage at the identified timestamp to be below the size of the scratchpad memory;
   selecting one or more tensor candidates to spill based on one or more heuristics;
   performing, using a satisfiability modulo theories (SMT) solver, address assignments for the scratchpad memory to store remaining tensors that have not been selected for spilling; and
   generating machine instructions based on the address assignments and spill operations for the tensors of the neural network model.

2. The computer-implemented method of claim 1, wherein performing the address assignments includes:
   generating a directed interference graph and a set of undecided edges for the tensors that have not been selected for spilling; and
   providing constraints from the directed interference graph and the set of undecided edges to the SMT solver.

3. The computer-implemented method of claim 2, wherein performing the address assignments further includes identifying an additional tensor from the remaining tensors to spill based on a constraint that the SMT solver fails to satisfy.

4. The computer-implemented method of claim 1, wherein the one or more heuristics include a tensor size and a loop-level live interval of each tensor candidate.

5. The computer-implemented method of claim 1, wherein each loop-level live interval is represented using an affine schedule for the corresponding tensor.

6. A computer-implemented method comprising:

obtaining an interference graph having nodes and edges connecting node pairs, wherein each node represents a tensor of a neural network model to store in a buffer memory, and each edge between a node pair indicates that tensors represented by the nodes of the node pair have overlapping live ranges;

determining a set of directed edges and a set of undecided edges in the interference graph;

forming a directed interference graph from the set of directed edges; and providing constraints based on the directed interference graph and the set of undecided edges to a constraints solver to assign addresses in the buffer memory for storing the tensors of the neural network model.

7. The computer-implemented method of claim 6, wherein the set of directed edges includes edges in the interference graph that are each between a pair of tensors in which a live range of a first tensor in the pair completely overlaps a live range of a second tensor in the pair.

8. The computer-implemented method of claim 6, wherein the set of undecided edges includes edges in the interference graph that are each between a pair of tensors in which a live range of a first tensor in the pair partially overlaps a live range of a second tensor in the pair.

9. The computer-implemented method of claim 6, wherein forming the directed interference graph includes:

sorting the set of directed edges into an order based on a set of one or more heuristics; and performing operations on each of the directed edges in the sorted order, the operations including:

selecting a direction for a directed edge; and adding the directed edge to the directed interference graph.

10. The computer-implemented method of claim 9, further comprising:

verifying a longest path in the directed interference graph is less than a size of the buffer memory.

11. The computer-implemented method of claim 9, further comprising:

verifying that the directed interference graph corresponds to a directed acyclic graph.

12. The computer-implemented method of claim 6, wherein assigning the addresses results in an unsatisfiable core, and the method further comprises performing additional iterations of address assignment by:

updating the directed interference graph by removing one or more directed edges from the directed interference graph, and updating the set of undecided edges to include the removed one or more directed edges; and providing updated constraints from the updated directed interference graph and the updated set of undecided edges to the constraints solver.

13. The computer-implemented method of claim 12, wherein when a constraint remains unsatisfiable after removing all removable directed edges from the directed interference graph, the method further includes:

identifying a spill candidate associated with the constraint; and updating the interference graph by removing the spill candidate associated with the constraint from the interference graph.

14. The computer-implemented method of claim 6, wherein the interference graph is obtained after determining an initial set of tensors to spill at timestamps having a memory usage estimation exceeding a size of the buffer memory.

15. The computer-implemented method of claim 14, wherein the memory usage estimation is determined based on loop-level live intervals of the tensors represented as affine schedules.

16. The computer-implemented method of claim 15, wherein the loop-level live intervals are approximated by replacing iteration variables in the affine schedules with numeric values.

17. A non-transitory computer readable medium having stored therein instructions that, when executed by one or more processors, cause the one or more processors to execute a compiler, the compiler performing operations including:

obtaining an interference graph having nodes and edges connecting node pairs, wherein each node represents a tensor of a neural network model to store in a buffer memory, and each edge between a node pair indicates that tensors represented by the nodes of the node pair have overlapping live ranges;

determining a set of directed edges and a set of undecided edges in the interference graph;

forming a directed interference graph from the set of directed edges; and providing constraints based on the directed interference graph and the set of undecided edges to a constraints solver to assign addresses in the buffer memory for storing the tensors of the neural network model.

18. The non-transitory computer readable medium of claim 17, wherein the operations include:

determining an initial set of tensors to spill at timestamps having a memory usage estimation exceeding a size of the buffer memory.

19. The non-transitory computer readable medium of claim 17, wherein the operations include:

updating the directed interference graph by removing one or more directed edges from the directed interference graph, and updating the set of undecided edges to include the removed one or more directed edges; and providing updated constraints from the updated directed interference graph and the updated set of undecided edges to the constraints solver.

20. The non-transitory computer readable medium of claim 17, wherein the operations include:

identifying a spill candidate associated with an unsatisfiable constraint; and updating the interference graph by removing the spill candidate associated with the unsatisfiable constraint from the interference graph.

* * * * *